United States Patent
Tanaka et al.

(10) Patent No.: US 7,622,418 B2
(45) Date of Patent: Nov. 24, 2009

(54) METHOD FOR PRODUCING EXHAUST GAS PURIFYING CATALYST

(75) Inventors: Hirohisa Tanaka, Shiga (JP); Isao Tan, Shiga (JP); Mari Uenishi, Shiga (JP); Nobuhiko Kajita, Shiga (JP); Masashi Taniguchi, Shiga (JP); Yasunori Sato, Shizuoka (JP); Keiichi Narita, Shizuoka (JP); Noboru Sato, Shizuoka (JP)

(73) Assignees: Daihatsu Motor Company, Ltd., Osaka (JP); Hokko Chemical Industry Co., Ltd., Tokyo (JP)

( * ) Notice: Subject to any disclaimer, the term of this patent is extended or adjusted under 35 U.S.C. 154(b) by 645 days.

(21) Appl. No.: 10/520,520

(22) PCT Filed: Jul. 3, 2003

(86) PCT No.: PCT/JP03/08440

§ 371 (c)(1),
(2), (4) Date: Jan. 7, 2005

(87) PCT Pub. No.: WO2004/004899

PCT Pub. Date: Jan. 15, 2004

(65) Prior Publication Data

US 2005/0255993 A1  Nov. 17, 2005

(30) Foreign Application Priority Data

| Jul. 9, 2002 | (JP) | 2002-200590 |
|---|---|---|
| Jul. 9, 2002 | (JP) | 2002-200591 |
| Jul. 9, 2002 | (JP) | 2002-200592 |
| Oct. 11, 2002 | (JP) | 2002-299552 |
| Oct. 11, 2002 | (JP) | 2002-299553 |
| Oct. 11, 2002 | (JP) | 2002-299555 |
| Dec. 17, 2002 | (JP) | 2002-364616 |
| Dec. 20, 2002 | (JP) | 2002-370475 |
| Dec. 20, 2002 | (JP) | 2002-370476 |

(51) Int. Cl.
*B01J 23/00* (2006.01)

(52) U.S. Cl. ..................... 502/325; 502/525

(58) Field of Classification Search ................ 502/325, 502/525
See application file for complete search history.

(56) References Cited

U.S. PATENT DOCUMENTS

| 3,905,918 A | 9/1975 | Mai et al. |
|---|---|---|
| 4,126,580 A | 11/1978 | Lauder |
| 4,182,694 A | 1/1980 | Lauder |
| 4,200,554 A | 4/1980 | Lauder |
| 4,237,030 A * | 12/1980 | Noguchi et al. ............ 502/207 |
| 4,294,726 A | 10/1981 | Bozon et al. |
| 4,303,552 A | 12/1981 | Ernest et al. |
| 4,921,829 A | 5/1990 | Ozawa et al. |
| 5,139,992 A | 8/1992 | Tauster et al. |
| 5,212,142 A | 5/1993 | Dettling |
| 5,254,519 A | 10/1993 | Wan et al. |
| 5,380,692 A | 1/1995 | Nakatsuji |
| 5,439,865 A | 8/1995 | Abe et al. |
| 5,447,705 A | 9/1995 | Petit et al. |
| 5,462,907 A | 10/1995 | Farrauto et al. |
| 5,491,120 A | 2/1996 | Voss et al. |
| 5,622,680 A | 4/1997 | Monceaux et al. |
| 5,691,263 A | 11/1997 | Park et al. |
| 5,814,576 A | 9/1998 | Yamamoto |
| 5,837,642 A | 11/1998 | Tanaka et al. |
| 5,849,659 A | 12/1998 | Tanaka et al. |
| 5,990,038 A | 11/1999 | Suga et al. |
| 6,033,632 A | 3/2000 | Schwartz et al. |
| 6,261,989 B1 | 7/2001 | Tanaka et al. |
| 6,352,955 B1 | 3/2002 | Golden |
| 6,464,946 B1 | 10/2002 | Yamada et al. |
| 6,531,425 B2 | 3/2003 | Golden |

(Continued)

FOREIGN PATENT DOCUMENTS

| EP | 0 130 835 A2 | 1/1985 |
|---|---|---|
| EP | 0525677 A | 7/1992 |
| EP | 1 035 074 A | 9/2000 |
| FR | 2 665 089 | 1/1992 |
| JP | S51-91890 | 8/1976 |
| JP | 51-104488 | 9/1976 |
| JP | 51-123792 | 10/1976 |
| JP | S60-025544 | 2/1985 |

(Continued)

OTHER PUBLICATIONS

Tanaka et al., "An Intelligent Catalyst" SAE Technical Paper Series, SAE 2001 World Congress, Detroit Michigan, Mar. 5-8, 2001.

(Continued)

*Primary Examiner*—Jessica L Ward
*Assistant Examiner*—Nicholas P D'Aniello
(74) *Attorney, Agent, or Firm*—Jean C. Edwards, Esq.; Akerman Senterfitt

(57) ABSTRACT

To provide a method for industrially efficiently producing an exhaust gas purifying catalyst containing a perovskite-type composite oxide which is stable and has a less reduced specific surface area and is also effectively prevented from decreasing in its catalytic performance even in endurance in high temperature oxidative reducing atmospheres, a pre-crystallization composition containing elementary components constituting a perovskite-type composite oxide containing a noble metal is prepared, is mixed with a powder of theta-alumina and/or alpha-alumina to prepare a mixture, and the mixture is heat treated. Thus, the resulting perovskite-type composite oxide supported by the powder of theta-alumina and/or alpha-alumina can keep its thermostability at a sufficient level thereby to effectively prevent the catalytic performance from decreasing. This method can industrially efficiently produce the exhaust gas purifying catalyst.

9 Claims, No Drawings

U.S. PATENT DOCUMENTS

| | | | |
|---|---|---|---|
| 6,534,031 | B2 | 3/2003 | Bedard |
| 6,569,803 | B2 | 5/2003 | Takeuchi |
| 6,576,200 | B1 | 6/2003 | Yamamoto et al. |
| 6,602,479 | B2 | 8/2003 | Taniguchi et al. |
| 6,620,762 | B2 | 9/2003 | Tan et al. |
| 6,682,706 | B1 | 1/2004 | Yamamoto et al. |
| 6,800,388 | B2 | 10/2004 | Kaneko et al. |
| 6,808,687 | B1 | 10/2004 | Uenishi et al. |
| 6,864,214 | B2 | 3/2005 | Uenishi et al. |
| 6,881,384 | B1 | 4/2005 | Uenishi et al. |
| 2001/0053467 | A1* | 12/2001 | Kaneko et al. ............... 429/19 |

FOREIGN PATENT DOCUMENTS

| | | | |
|---|---|---|---|
| JP | 61-191518 | | 8/1986 |
| JP | 61-232217 | | 10/1986 |
| JP | S62-106845 | | 5/1987 |
| JP | S632-241552 | | 10/1987 |
| JP | 62-254845 | | 11/1987 |
| JP | S62-262745 | | 11/1987 |
| JP | 63-54940 | | 3/1988 |
| JP | S63-302950 | | 12/1988 |
| JP | H01-011643 | | 1/1989 |
| JP | 1-168343 | | 7/1989 |
| JP | H 2-265648 | | 10/1990 |
| JP | H3-068451 | | 3/1991 |
| JP | H3-186346 | | 8/1991 |
| JP | H5-31367 | | 2/1993 |
| JP | H5-76762 | | 3/1993 |
| JP | H5-220395 | | 8/1993 |
| JP | H5-245372 | | 9/1993 |
| JP | H5-253484 | | 10/1993 |
| JP | H5-509033 | | 12/1993 |
| JP | H6-100319 | | 4/1994 |
| JP | H6-210175 | | 8/1994 |
| JP | H6-304449 | | 11/1994 |
| JP | 07-080310 | | 3/1995 |
| JP | 7-80310 | | 3/1995 |
| JP | H7-68175 | | 3/1995 |
| JP | H7-80311 | | 3/1995 |
| JP | H7-116519 | | 5/1995 |
| JP | H7-299360 | | 11/1995 |
| JP | H7-308578 | | 11/1995 |
| JP | H8-217461 | | 8/1996 |
| JP | H8-224446 | | 9/1996 |
| JP | 9-59022 | | 3/1997 |
| JP | 09-059022 | | 3/1997 |
| JP | 9-164332 | | 6/1997 |
| JP | 10-101489 | | 4/1998 |
| JP | H10-277389 | | 10/1998 |
| JP | 11-019521 | | 1/1999 |
| JP | H11-057471 | | 3/1999 |
| JP | H11-57471 | | 3/1999 |
| JP | H11-207183 | | 8/1999 |
| JP | 11-262663 | * | 9/1999 |
| JP | H11-262663 | | 9/1999 |
| JP | 2000-015097 | | 1/2000 |
| JP | 2000-042368 | | 2/2000 |
| JP | 2000-143251 | | 5/2000 |
| JP | 2000-256017 | | 9/2000 |
| JP | 2000-279814 | | 10/2000 |
| JP | 2001-224963 | | 8/2001 |
| WO | WO 2004/004899 A1 | | 1/2004 |

OTHER PUBLICATIONS

Tanaka et al., "Regeneration of palladium subsequent to solid solution and segregation in a perovskite . . . " Klower Academic/Plenum Publishers, vol. 16/17 Nos. 1-4 Sep. 2001.

Motohiro et al. "Time-resolved time-of-flight mass spectrometry with molecular-pulse-probes for analysis of dynamic (I) . . . " Applied Surface Science 121/122 (1997) 319-322.

Motohiro et al. "Time-resolved time-of-flight mass spectrometry with molecular-pulse-probes for analysis of dynamic (II) . . . " Applied Surface Science 121/122 (1997) 323-326.

Kajita et al. "Regeneratoin of precious metals in various designed intelligent perovskite . . . " SAE Technical Paper Series, SAE World Congres, Detroit Michigan Mar. 4-7, 2002.

Nolven Guilhaume and Michael Primet, Three-Way Catalytic Activity and Oxygen Storage Capacity of Perovskite $LaMn_{0.976}Rh_{0.024}O_{3+\sigma}$, 1997, p. 197-204, vol. 165.

Hirohisa Tanaka et al. "Perovskite Shokubai eno Kikinzou Tanji Koka" Shokubai Toronkai Toronkai A Yokoshu, vol. 88, 2001, p. 112.

Iseki Yoshikazu et al., "Analysis of Solid Solution Formation and Precipitation Phenomena of Pd in Pd Perovskite Catalyst", Catalysts & Catalysts, 2002, vol. 44, No. 2 2002.

* cited by examiner

METHOD FOR PRODUCING EXHAUST GAS PURIFYING CATALYST

TECHNICAL FIELD

The present invention relates to a method for producing an exhaust gas purifying catalyst. More specifically, it relates to a method for producing an exhaust gas purifying catalyst containing a perovskite-type composite oxide for use as an exhaust gas purifying catalyst.

BACKGROUND ART

Perovskite-type composite oxides each supporting a noble metal such as Pt (platinum), Rh (rhodium), or Pd (palladium) have been known as three-way catalysts which can simultaneously clean up carbon monoxide (CO), hydrocarbons (HC), and nitrogen oxides (NOx) contained in emissions. Such perovskite-type composite oxides are represented by a general formula: $ABO_3$ and enable the supported noble metal to satisfactorily exhibit its catalytic activity.

These perovskite-type composite oxides, however, undergo grain growth, thereby to have a decreased specific surface area at a high temperature of about 1000° C. The resulting catalysts can only contact with exhaust gas components in a shorter time and exhibit remarkably decreased catalytic performance in an operating environment at a high space velocity as in the case of exhaust gas purifying catalysts for automobiles.

Accordingly, various attempts have been proposed to increase their thermostability by allowing such a perovskite-type composite oxide to be supported by a thermostable composite oxide containing Ce (cerium) and/or Zr (zirconium) and, for example, the use of $Ce_{0.8}Zr_{0.2}O_2$ and $Ce_{0.65}Zr_{0.30}Y_{0.05}O_2$ as the thermostable composite oxide has been proposed in Laid-open (Unexamined) Patent Publications No. Hei 5-31367, No. Hei 5-220395, No. Hei 5-253484, No. Hei 6-210175, No. Hei 7-68175, and No. Hei 7-80311.

Laid-open (Unexamined) Patent Publication No. Hei 5-31367 discloses the method comprising adding an aqueous solution containing nitrates of metal constituting a perovskite-type composite oxide in a predetermined stoichiometric ratio to thermostable composite oxide powders, drying the mixture at about 100° C. for 5 to 12 hours and further baking at 700° C. to 800° C. for 3 to 10 hours, thereby to support the perovskite-type composite oxide by the thermostable composite oxide.

Even the perovskite-type composite oxide is supported by the thermostable composite oxide containing Ce and/or Zr, however, it is difficult to secure sufficient thermostability of the perovskite-type composite oxide.

DISCLOSURE OF INVENTION

Accordingly, an object of the present invention is to provide a method for industrially efficiently producing an exhaust gas purifying catalyst containing a perovskite-type composite oxide which is stable, has a less reduced specific surface area and is effectively prevented from decreasing in its catalytic performance even in endurance in high temperature oxidative-reducing atmospheres.

The method for producing an exhaust gas purifying catalyst of the present invention comprises the steps of preparing a pre-crystallization composition containing elementary components the elementary components constituting a perovskite-type composite oxide containing a noble metal; mixing the pre-crystallization composition with a powder of theta (θ)-alumina and/or alpha(α)-alumina to prepare a mixture; and subjecting the mixture to heat treatment.

In the method of the present invention, the perovskite-type composite oxide is preferably represented by the general formula (1):

$$AB_{1-m}N_mO_3 \quad (1)$$

wherein A represents at least one element selected from rare earth elements and alkaline earth metals; B represents at least one element selected from Al and transition elements excluding the rare earth elements and noble metals; N represents at least one noble metal; and m represents an atomic ratio of N satisfying the following relation: 0<m<0.5.

N in the general formula (1) is preferably at least one selected from the group consisting of Rh, Pd, and Pt.

The perovskite-type composite oxide represented by the general formula (1) is preferably at least one selected from the group consisting of Rh containing perovskite-type composite oxides represented by the following general formula (2), Pd containing perovskite-type composite oxides represented by the following general formula (3), and Pt containing perovskite-type composite oxides represented by the following general formula (4):

$$A_{1-p}A'_pB_{1-q}Rh_qO_3 \quad (2)$$

wherein A represents at least one element selected from La, Nd, and Y; A' represents Ce and/or Pr; B represents at least one element selected from Fe, Mn, and Al; p represents an atomic ratio of A' satisfying the following relation: 0≦p<0.5; and q represents an atomic ratio of Rh satisfying the following relation: 0<q≦0.8, $$AB_{1-r}Pd_rO_3 \quad (3)$$

wherein A represents at least one element selected from La, Nd, and Y; B represents at least one element selected from Fe, Mn, and Al; and r represents an atomic ratio of Pd satisfying the following relation: 0<r<0.5, $$A_{1-s}A'_sB_{1-t-u}B'_tPt_uO_3 \quad (4)$$

wherein A represents at least one element selected from La, Nd, and Y; A' represents at least one element selected from Mg, Ca, Sr, Ba, and Ag; B represents at least one element selected from Fe, Mn, and Al; B' represents at least one element selected from Rh and Ru; s represents an atomic ratio of A' satisfying the following relation: 0<s≦0.5; t represents an atomic ratio of B' satisfying the following relation: 0≦t<0.5; and u represents an atomic ratio of Pt satisfying the following relation: 0<u≦0.5.

Theta-alumina and alpha-alumina is preferably represented by the following general formula (5):

$$(Al_{1-g}D_g)_2O_3 \quad (5)$$

wherein D represents La and/or Ba; and g represents an atomic ratio of D satisfying the following relation: 0≦g≦0.5.

In the method of the present invention, the pre-crystallization composition is preferably prepared by mixing a solution containing alkoxides of elementary components constituting the perovskite-type composite oxide excluding at least one noble metal with a solution containing an organometal salt of at least one noble metal.

In the method of the present invention, the organometal salt of the noble metal is preferably a noble metal complex comprising at least one of a β-diketone compound or β-ketoester compound represented by the following general formula (6)

and/or a β-dicarboxylic ester compound represented by the following general formula (7):

$$R^3COCHR^5COR^4 \qquad (6)$$

wherein $R^3$ represents an alkyl group having 1 to 6 carbon atoms, a fluoroalkyl group having 1 to 6 carbon atoms or an aryl group; $R^4$ represents an alkyl group having 1 to 6 carbon atoms, a fluoroalkyl group having 1 to 6 carbon atoms, an aryl group or an alkyloxy group having 1 to 4 carbon atoms; and $R^5$ represents a hydrogen atom or an alkyl group having 1 to 4 carbon atoms, $$R^7CH(COOR^6)_2 \qquad (7)$$

wherein $R^6$ represents an alkyl group having 1 to 6 carbon atoms; and $R^7$ represents a hydrogen atom or an alkyl group having 1 to 4 carbon atoms.

The method for producing a catalyst composition of the present invention comprises the steps of preparing a pre-crystallization composition containing elementary components, the elementary components constituting a perovskite-type composite oxide containing a noble metal; mixing the pre-crystallization composition with a powder of theta-alumina and/or alpha-alumina to prepare a mixture; and subjecting the mixture to heat treatment.

According to the method for producing an exhaust gas purifying catalyst of the present invention, since the perovskite-type composite oxide is supported by the powder of theta-alumina and/or alpha-alumina, the resulting exhaust gas purifying catalyst containing a perovskite-type composite oxide is stable and has a less reduced specific surface area and also can keep sufficient thermostability of the perovskite-type composite oxide even in endurance in high temperature oxidative reducing atmospheres, thereby to effectively avoid the catalytic performance from decreasing.

BEST MODE FOR CARRYING OUT THE INVENTION

The method for producing an exhaust gas purifying catalyst of the present invention is a method comprising supporting perovskite-type composite oxides containing a noble metal by theta-alumina and/or alpha-alumina thereby to produce an exhaust gas purifying catalyst.

The perovskite-type composite oxide containing a noble metal for use in the present invention are composite oxides each having a perovskite structure represented by the general formula: $ABO_3$ and comprising a noble metal as a constituent (excluding composite oxides wherein the noble metal was supported by the perovskite-type composite oxide later), and are also represented by, for example, the following general formula (1):

$$AB_{1-m}N_mO_3 \qquad (1)$$

wherein A represents at least one element selected from rare-earth elements and alkaline earth metals; B represents at least one element selected from Al and transition elements excluding rare-earth elements and noble metals; N represents one or more noble metals; and m represents an atomic ratio of N satisfying the following relation: 0<m<0.5.

In general formula (1), examples of the rare-earth elements represented by A include Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

Examples of the alkaline earth metals represented by A include Be (beryllium), Mg (magnesium), Ca (calcium), Sr (strontium), Ba (barium), and Ra (radium). These alkaline earth metals can be used alone or in combination.

Examples of the transition elements represented by B excluding the rare-earth elements and the noble metals in general formula (1) include elements having atomic numbers of 22 (Ti) through 30 (Zn), atomic numbers of 40 (Zr) through 48 (Cd), and atomic numbers of 72 (Hf) through 80 (Hg) in the Periodic Table of Elements (IUPAC, 1990) except for the noble metals having atomic numbers of 44 through 47 and 76 through 78. These transition elements can be used alone or in combination.

Preferred examples of B, i.e., Al and the transition elements excluding the rare-earth elements and the noble metals, include Ti (titanium), Cr (chromium), Mn (manganese), Fe (iron), Co (cobalt), Ni (nickel), Cu (copper), Zn (zinc), and Al (aluminum).

Examples of the noble metal represented by N in the general formula (1) include Ru (ruthenium), Rh (rhodium), Pd (palladium), Ag (silver), Os (osmium), Ir (iridium), and Pt (platinum), of which Rh, Pd, and Pt are preferred. These noble metals can be used alone or in combination.

The atomic ratio m satisfies the relation: 0<m<0.5. Namely, N is an essential component, the atomic ratio of N is less than 0.5, and the atomic ratio of B is 0.5 or more.

In the present invention, N in the general formula (1) is preferably at least one selected from the group consisting of Rh, Pd, and Pt.

More specifically, if the noble metal is Rh, Rh containing perovskite-type composite oxides represented by the following general formula (2) are preferably used as the perovskite-type composite oxide:

$$A_{1-p}A'_pB_{1-q}Rh_qO_3 \qquad (2)$$

wherein A represents at least one element selected from La, Nd, and Y; A' represents Ce and/or Pr; B represents at least one element selected from Fe, Mn, and Al; p represents an atomic ratio of A' satisfying the following relation: $0 \leq p < 0.5$; and q represents an atomic ratio of Rh satisfying the following relation: $0 < q \leq 0.8$.

If the noble metal is Pd, Pd containing perovskite-type composite oxides represented by the following general formula (3) are preferably used:

$$AB_{1-r}Pd_rO_3 \qquad (3)$$

wherein A represents at least one element selected from La, Nd, and Y; B represents at least one element selected from Fe, Mn, and Al; and r represents an atomic ratio of Pd satisfying the following relation: 0<r<0.5.

If the noble metal is Pt, Pt containing perovskite-type composite oxides represented by the following general formula (4) are preferably used:

$$A_{1-s}A'_sB_{1-t-u}B'_tPt_uO_3 \qquad (4)$$

wherein A represents at least one element selected from La, Nd, and Y; A' represents at least one element selected from Mg, Ca, Sr, Ba, and Ag; B represents at least one element selected from Fe, Mn, and Al; B' represents at least one element selected from Rh and Ru; s represents an atomic ratio of A' satisfying the following relation: $0 < s \leq 0.5$; t represents an atomic ratio of B' satisfying the following relation: $0 \leq t < 0.5$; and u represents an atomic ratio of Pt satisfying the following relation: $0 < u \leq 0.5$.

The theta-alumina for use in the present invention is a kind of intermediate (transitional) alumina until it is transferred to alpha-alumina, and has a theta phase as its crystal phase. The theta-alumina can be prepared, for example, by heat-treating a commercially available active alumina (gamma-alumina) at 900° C. to 1100° C. in the atmosphere for 1 to 10 hours.

The theta-alumina is available, for example, by heat-treating SPHERALITE 531P (a trade name of a gamma-alumina produced by PROCATALYSE) at 1000° C. in the atmosphere for 1 to 10 hours.

The alpha-alumina for use in the present invention has an alpha phase as its crystal phase and includes, for example, AKP-53 (a trade name of a high-purity alumina produced by Sumitomo Chemical Industries Co., Ltd.).

Such an alpha-alumina can be prepared, for example, by an alkoxide process, a sol-gel process, or a coprecipitation process.

At least one of theta-alumina and alpha-alumina for use in the present invention may comprise La and/or Ba. Namely, one represented by the following general formula (5) is preferably used:

$$(Al_{1-g}D_g)_2O_3 \qquad (5)$$

wherein D represents La and/or Ba; and g represents an atomic ratio of D satisfying the following relation: $0 \leq g \leq 0.5$.

D represents La and/or Ba, and the atomic ratio of D represented by g ranges from 0 to 0.5. Namely, La and/or Ba is not an essential component but is an optional component which may be contained optionally, and the atomic ratio thereof is, if contained, 0.5 or less. If the atomic ratio of La and/or Ba exceeds 0.5, the crystal phase may not maintain its theta phase and/or alpha phase.

The theta-alumina and/or alpha-alumina is allowed to comprise La and/or Ba, for example, by appropriately controlling a baking temperature in a production process using aluminum oxide and a salt or alkoxide of La and/or Ba by a conventional method. Alternatively, the theta-alumina and/or alpha-alumina comprising La and/or Ba can be obtained, for example, by impregnating theta-alumina and/or alpha-alumina with a solution of a salt of La and/or Ba, followed by drying and baking.

At least one of theta-alumina and alpha-alumina has a specific surface area of preferably 5 $m^2/g$ or more, or more preferably 10 $m^2/g$ or more. In particular, theta-alumina has a specific surface area of preferably 50 $m^2/g$ to 150 $m^2/g$, or more preferably 100 $m^2/g$ to 150 $m^2/g$. A plurality of theta-alumina and/or alpha-alumina having different atomic ratios of La and/or Ba can be used in combination.

The amount of at least one of theta-alumina and alpha-alumina to support the perovskite-type composite oxide is not specifically limited and is, for example, 0.5 parts to 20 parts by weight, and preferably 0.5 parts to 10 parts by weight, to 1 part by weight of the perovskite-type composite oxide. If the amount of at least one of theta-alumina and alpha-alumina is less than the above-specified range, the perovskite-type composite oxide may not be sufficiently effectively dispersed and may fail to prevent grain growth in an atmosphere of high temperature. A proportion of at least one of theta-alumina and alpha-alumina exceeding the above-specified range may invite disadvantages in cost and production.

The method for producing an exhaust gas purifying catalyst of the present invention comprises preparing a pre-crystallization composition containing elementary components, the elementary components constituting a perovskite-type composite oxide containing a noble metal; mixing the pre-crystallization composition with a powder of theta-alumina and/or alpha-alumina to prepare a mixture; and subjecting the mixture to heat treatment. This allows the pre-crystallization composition to crystallize, thereby to allow the theta-alumina and/or alpha-alumina to support the perovskite-type composite oxide containing a noble metal.

More specifically, such a method can be classified into a coprecipitation process, a citrate complex process, and an alkoxide process.

In the coprecipitation process, in at least any one of the steps of preparing an aqueous mixed salt solution (pre-crystallization composition) containing salts of the above-mentioned elements (element components) in a predetermined stoichiometric ratio, coprecipitating the aqueous mixed salt solution by the addition of a neutralizing agent to obtain a coprecipitate (pre-crystallization composition), drying the the resulting coprecipitate, and heat-treating the dried product thereof (pre-crystallization composition), the pre-crystallization composition before subjecting to a heat treatment is mixed with powders of at least one of theta-alumina and alpha-alumina.

Examples of the salts of the elements include inorganic salts such as sulfates, nitrates, chlorides, and phosphates; and organic salts such as acetates and oxalates. The aqueous mixed salt solution can be prepared, for example, by adding the salts of the elements to water in such proportions as to establish a predetermined stoichiometric ratio and mixing them with stirring.

The neutralizing agent includes, for example, organic bases such as ammonia, triethylamine, and pyridine; and inorganic bases such as sodium hydroxide, potassium hydroxide, potassium carbonate, and ammonium carbonate. The neutralizing agent is added dropwise to the aqueous mixed salt solution so that the solution after the addition of the neutralizing agent has a pH of about 6 to 10.

The resulting coprecipitate is, where necessary, washed with water, is dried typically by vacuum drying or forced-air drying to obtain a dried product.

Alternatively, an aqueous mixed solution of elements excluding a noble metal is coprecipitated to obtain a coprecipitate and a dried product obtained by drying the coprecipitate is mixed with a solution organometal salts of the noble metal to obtain a homogeneous mixed slurry, and then the homogeneous mixed slurry is dried to obtain a dried product (pre-crystallization composition).

In the coprecipitation process, the powder of at least one of theta-alumina and alpha-alumina may be added, for example, to the prepared aqueous mixed salt solution (pre-crystallization composition), the resulting coprecipitate (pre-crystallization composition), or a dried product thereof (pre-crystallization composition), where necessary, in the form of a slurry or solution to obtain a mixture, and the mixture is heat-treated, for example, at about 500° C. to 1000° C., and preferably at about 600° C. to 950° C., thereby to obtain a powdery exhaust gas purifying catalyst comprising at least one of theta-alumina and alpha-alumina supporting a perovskite-type composite oxide.

In the citrate complex process, for example, in at least any one of the steps of preparing an aqueous citrate mixed salt solution (pre-crystallization composition) containing citric acid and the salts of the respective elements (element component) in such proportions as to establish a predetermined stoichiometric ratio of the salts of the respective elements, evaporating the aqueous citrate mixed salt solution to dryness to form a dried product (pre-crystallization composition) of a citrate complex of the respective elements, and heat-treating the resulting dried product, the pre-crystallization composition before subjecting to a heat treatment is mixed with powders of at least one of theta-alumina and alpha-alumina.

The same as listed above can be used as the salts of the elements herein. The aqueous citrate mixed salt solution can be prepared by initially preparing an aqueous mixed salt solution by the above procedure and adding an aqueous solution of citric acid to the aqueous mixed salt solution.

The evaporation to dryness is carried out at such a temperature at which the formed citrate complex is not decomposed, for example, at room temperature to about 150° C., thereby to remove the fluid immediately. The citrate complex of the elements is thus obtained.

Alternatively, an aqueous citrate mixed salt solution containing the respective elements excluding a noble metal is prepared and dried to form a citrate complex, and a heat-treated product obtained by a heat treatment of the citrate complex is mixed with a solution of organometal salts of a noble metal to prepare a homogeneous mixed slurry, and then the homogeneous mixed slurry is dried to obtain a dried product (pre-crystallization composition).

In the citrate complex process, the powder of at least one of theta-alumina and alpha-alumina may be added, for example, to at least one of the prepared aqueous citrate mixed salt solution (pre-crystallization composition) and a dried product thereof (pre-crystallization composition), where necessary, in the form of a slurry or solution to obtain a mixture, and the mixture is heated, for example, at 250° C. or higher in vacuum or in an inert atmosphere, and then heat-treated, for example, at about 500° C. to 1000° C., and preferably at about 600° C. to 950° C., thereby to obtain a powdery exhaust gas purifying catalyst comprising at least one of theta-alumina and alpha-alumina supporting a perovskite-type composite oxide.

In the alkoxide process, for example, in at least any one of the steps of preparing a mixed alkoxide solution (pre-crystallization composition) containing alkoxides of the respective elements excluding the noble metal in the stoichiometric ratio, precipitating the mixed alkoxide solution on hydrolysis by adding an aqueous solution containing salts of the noble metal thereto to obtain a precipitate (pre-crystallization composition), drying the precipitate and heat-treating the resulting dried product (pre-crystallization composition), the pre-crystallization composition before subjecting to a heat treatment is mixed with powders of at least one of theta-alumina and alpha-alumina.

Examples of the alkoxides of the respective elements include alcholates each comprising the element and an alkoxy such as methoxy, ethoxy, propoxy, isopropoxy, or butoxy; and alkoxyalcholates of the respective elements represented by the following general formula (8):

wherein E represents the element; $R^1$ represents a hydrogen atom or an alkyl group having 1 to 4 carbon atoms; $R^2$ represents an alkyl group having 1 to 4 carbon atoms; i represents an integer of 1 to 3; and j represents an integer of 2 to 4.

More specific examples of the alkoxyalcholates include methoxyethylate, methoxypropylate, methoxybutylate, ethoxyethylate, ethoxypropylate, propoxyethylate, and butoxyethylate.

The mixed alkoxide solution can be prepared, for example, by adding the alkoxides of the respective elements to an organic solvent so as to establish the stoichiometric ratio and mixing them with stirring. The organic solvent is not specifically limited, as long as it can dissolve the alkoxides of the respective elements. Examples of such organic solvents include aromatic hydrocarbons, aliphatic hydrocarbons, alcohols, ketones, and esters. Among these organic solvents, aromatic hydrocarbons such as benzene, toluene, and xylene are preferred.

Subsequently, the mixed alkoxide solution is precipitated by adding an aqueous solution containing salts of the noble metals in a predetermined stoichiometric ratio. Examples of the aqueous solution containing salts of the noble metals include aqueous nitrate solution, aqueous chloride solution, aqueous hexaammine chloride solution, aqueous dinitrodiammine nitrate solution, hexachloro acid hydrate, and potassium cyanide salt.

The resulting precipitate (pre-crystallization composition) is then dried typically by vacuum drying or forced-air drying to obtain a dried product (pre-crystallization composition).

In the alkoxide process, the powder of at least one of theta-alumina and alpha-alumina may be added, for example, to the prepared mixed alkoxide solution (pre-crystallization composition), the resulting coprecipitate (pre-crystallization composition), or a dried product thereof (pre-crystallization composition), where necessary, in the form of a slurry or solution to obtain a mixture, and the mixture is heat-treated, for example, at about 500° C. to 1000° C., and preferably at about 500° C. to 850° C., thereby to obtain an exhaust gas purifying catalyst comprising at least one of theta-alumina and alpha-alumina supporting a perovskite-type composite oxide.

In the alkoxide process, a solution containing organometal salts of the noble metals is added to the mixed alkoxide solution to obtain a homogenous mixed solution (pre-crystallization composition).

Examples of the organometal salts of the noble metals include metal chelate complexes of the noble metals derived from, for example, β-diketone compounds or β-ketoester compounds represented by the following general formula (6) and/or β-dicarboxylic ester compounds represented by the following general formula (7):

wherein $R^3$ represents an alkyl group having 1 to 6 carbon atoms, a fluoroalkyl group having 1 to 6 carbon atoms or an aryl group; $R^4$ represents an alkyl group having 1 to 6 carbon atoms, a fluoroalkyl group having 1 to 6 carbon atoms, an aryl group or an alkyloxy group having 1 to 4 carbon atoms; and $R^5$ represents a hydrogen atom or an alkyl group having 1 to 4 carbon atoms,

wherein $R^6$ represents an alkyl group having 1 to 6 carbon atoms; and $R^7$ represents a hydrogen atom or an alkyl group having 1 to 4 carbon atoms.

In the above-mentioned general formulas (6) and (7), examples of the alkyl groups each having 1 to 6 carbon atoms as $R^3$, $R^4$, and $R^6$ include methyl, ethyl, propyl, isopropyl, n-butyl, s-butyl, t-butyl, t-amyl, and t-hexyl. Examples of the alkyl groups each having 1 to 4 carbon atoms as $R^5$ and $R^7$ include methyl, ethyl, propyl, isopropyl, n-butyl, s-butyl, and t-butyl. The fluoroalkyl groups each having 1 to 6 carbon atoms as $R^3$ and $R^4$ include, for example, trifluoromethyl. The aryl groups as $R^3$ and $R^4$ include, for example, phenyl. The alkyloxy group having 1 to 4 carbon atoms as $R^4$ includes, for example, methoxy, ethoxy, propoxy, isopropoxy, n-butoxy, s-butoxy, and t-butoxy.

More specific examples of the β-diketone compounds include 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione, and dipivaloylmethane. Examples of the β-ketoester compounds include methyl acetoacetate, ethyl acetoacetate, and t-butyl acetoacetate. Examples of the β-dicarboxylic ester compounds include dimethyl malonate and diethyl malonate.

The solution containing the organometal salts of the noble metals can be prepared, for example, by adding the organometal salts of the noble metals to an organic solvent so as to establish the stoichiometric ratio and mixing them with stirring. The same as listed above can be used as the organic solvent herein.

In at least any one of the steps of mixing thus-prepared solution containing the organometal salts of the noble metals with the mixed alkoxide solution to prepare the homogenous mixed solution (pre-crystallization composition), precipitating the homogenous mixed solution by adding water thereto to obtain a precipitate (pre-crystallization composition), drying the precipitate and heat-treating the dried product (pre-crystallization composition), the powder of at least one of theta-alumina and alpha-alumina may be added, where necessary, in the form of a solution to obtain a mixture, and the mixture is heat-treated at about 400° C. to 1000° C., and preferably at about 500° C. to 850° C., thereby to obtain an exhaust gas purifying catalyst comprising at least one of theta-alumina and alpha-alumina supporting a perovskite-type composite oxide.

In the alkoxide process, preparation of a homegeneous mixed solution containing organometal salts of the noble metal is prepared allows at least one of theta-alumina and alpha-alumina to support the perovskite-type composite oxide in the state of being sufficiently dispersed, and can improve catalytic activity. Namely, mixing of the homogenous mixed solution with a powder of at least one of theta-alumina and alpha-alumina allows at least one of theta-alumina and alpha-alumina to support the perovskite-type composite oxide in the state of being more sufficiently dispersed as compared with the case of mixing the mixed alkoxide solution with a powder of at least one of theta-alumina and alpha-alumina, and can improve catalytic activity furthermore.

If the homogeneous mixed solution is prepared in such a manner, bubbling over in a heat treatment can be prevented as compared with the case of preparing the element component constituting the perovskite-type composite oxide in the form of an aqueous mixed salt solution, and thus the catalyst can be industrially efficiently produced. This method does not yield harmful by-products and is excellent in safety or hygiene. Furthermore, the method can securely form a crystal structure of the perovskite-type composite oxide while suppressing a heat treatment temperature, and can effectively prevent a decrease in specific surface area.

According to the method for producing an exhaust gas purifying catalyst, since the perovskite-type composite oxide is supported by the powder of at least one of theta-alumina and alpha-alumina, the perovskite-type composite oxide is stable and has a less reduced specific surface area, and also can keep its thermostability at a sufficient level even in endurance in high temperature oxidative-reducing atmospheres, thereby to effectively avoid the catalytic performance from decreasing. This method can industrially efficiently produce the exhaust gas purifying catalyst.

The exhaust gas purifying catalyst thus obtained may further be mixed with at least one thermostable oxide selected from the group consisting of zirconia composite oxides, ceria composite oxides, theta-alumina, alpha-alumina, gamma-alumina, $SrZrO_3$ and $LaAlO_3$. By mixing with any of these thermostable oxides, the perovskite-type composite oxide can have further improved thermostability. This easily enables the exhaust gas purifying catalyst of the present invention to be used in a very severe atmosphere of high temperature such as in manifold converters.

The zirconia composite oxides are preferably represented by the following general formula (9):

$$Zr_{1-(a+b)}Ce_aR_bO_{2-c} \quad (9)$$

wherein R represents at least one of alkaline earth metals and rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect.

Examples of the alkaline earth metals represented by R include Be, Mg, Ca, Sr, Ba, and Ra, of which Mg, Ca, Sr, and Ba are preferred. The rare-earth elements represented by R are rare-earth elements excluding Ce, and examples thereof include Sc, Y, La, Pr, Nd, Pm, Sm, Eu, Gd, Tb, Dy, Ho, Er, Tm, Yb, and Lu. Among them, Sc, Y, La, Pr, and Nd are preferred. These alkaline earth metals and rare-earth elements can be used alone or in combination.

The atomic ratio of Ce represented by a ranges from 0.1 to 0.65. If the atomic ratio is less than 0.1, the crystal phase may become unstable to decompose in oxidative-reducing atmospheres at high temperatures, thereby to decrease the catalytic performance. If it exceeds 0.65, the catalyst may have a decreased specific surface area, thereby to fail to exhibit satisfactory catalytic performance. The atomic ratio of R represented by b ranges from 0 to 0.55. Namely, R is not an essential component but is an optional component to be contained optionally. The atomic ratio thereof is, if contained, 0.55 or less. An atomic ratio of R exceeding 0.55 may invite phase separation or formation of other composite oxide phases.

The atomic ratio of Zr represented by $[1-(a+b)]$ ranges from 0.35 to 0.9. The atomic ratio of Zr is preferably ranges from 0.5 to 0.9 and more preferably ranges from 0.6 to 0.9.

The zirconia composite oxide represented by the general formula (9) preferably has an atomic ratio of Ce of 0.5 or less. When the exhaust gas purifying catalyst comprises the zirconia composite oxide represented by the general formula (9) in combination with the ceria composite oxide represented by the general formula (10) mentioned below, the atomic ratio of Zr in the zirconia composite oxide represented by the general formula (9) is preferably greater than the atomic ratio of Zr in the ceria composite oxide represented by the general formula (10).

The amount c represents an oxygen defect which in turn means a ratio of vacancies formed in a fluorite-like crystal lattice generally composed of oxides of Zr, Ce and R.

These zirconia composite oxides can be prepared according to any of known processes without being limited to a particular process.

The ceria composite oxides are preferably represented by the following general formula (10):

$$Ce_{1-(d+e)}Zr_dL_eO_{2-f} \quad (10)$$

wherein L represents at least one of alkaline earth metals and rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

The same as the alkaline earth metals and rare-earth elements represented by R can be used as the alkaline earth metals and/or rare-earth elements represented by L. Preferred examples of the alkaline earth metals include Mg, Ca, Sr, and Ba, and preferred examples of the rare-earth elements include Sc, Y, La, Pr, and Nd. These alkaline earth metals and rare-earth elements can be used alone or in combination.

The atomic ratio of Zr represented by d ranges from 0.2 to 0.7. If the atomic ratio is less than 0.2, the resulting catalyst may have a decreased specific surface area, thereby to fail to exhibit sufficient catalytic performance. If it exceeds 0.7, the catalyst may have decreased oxygen occlusion capability to fail to exhibit sufficient catalytic performance. The atomic ratio of L represented by e ranges from 0 to 0.2. Namely, L is not an essential component but an optional component to be contained optionally in an atomic ratio of, if contained, 0.2 or less. An atomic ratio of L exceeding 0.2 may invite phase separation or formation of other composite oxide phases.

The atomic ratio of Ce represented by [1−(d+e)] ranges from 0.3 to 0.8, and preferably ranges from 0.4 to 0.6.

The ceria composite oxides represented by the general formula (10) each preferably have an atomic ratio of Zr of 0.5 or less. When used in combination with the zirconia composite oxide represented by the general formula (9) in the exhaust gas purifying catalyst, the atomic ratio of Ce in the ceria composite oxide represented by the general formula (10) is preferably greater than the atomic ratio of Ce in the zirconia composite oxide represented by the general formula (9).

The amount f represents an oxygen defect which in turn means a ratio of vacancies formed in a fluorite-like crystal lattice generally composed of oxides of Ce, Zr and L.

These ceria composite oxides can be prepared by the same procedures as in the production of the zirconia composite oxides.

When the zirconia composite oxide or the ceria composite oxide actually used has an atomic ratio falling both within the atomic ratios of the respective elements of the zirconia composite oxides represented by the general formula (9) and within the atomic ratios of the respective elements of the ceria composite oxides represented by the general formula (10), it can be classified as any of these composite oxides without being limited to a particular category. The category, for example, is appropriately set according to the formulation to be incorporated when a plurality of the zirconia composite oxides and/or the ceria composite oxides are used. When the noble metals are supported, for example, the ceria composite oxide can be distinguished from the zirconia composite oxide by allowing the ceria composite oxide to support not Rh but Pt alone.

The same as listed above can be used as the theta-alumina herein.

Likewise, the same as listed above can be used as the alpha-alumina herein.

The theta-alumina and/or alpha-alumina to be mixed in these supporting embodiments may comprise La and/or Ba, as is described above. Namely, one represented by the following general formula (5) is preferably used:

$(Al_{1-g}D_g)_2O_3$ (5)

wherein D represents La and/or Ba; and g represents an atomic ratio of D satisfying the following relation: $0 \leqq g \leqq 0.5$.

D represents La and/or Ba, and the atomic ratio of D represented by g ranges from 0 to 0.5. Namely, La and/or Ba is not an essential component but an optional component to be contained optionally in an atomic ratio of, if contained, 0.5 or less.

The gamma-alumina includes, but is not specifically limited to, known gamma-alumina used as an exhaust gas purifying catalyst.

$SrZrO_3$ can be prepared, for example, by the procedure of the production method of the zirconia composite oxides using a zirconium salt and a strontium salt, or an alkoxide of zirconium and an alkoxide of strontium.

$LaAlO_3$ can be prepared, for example, by the procedure of the production method of the zirconia composite oxides using a lanthanum salt and an aluminum salt, or an alkoxide of lanthanum and an alkoxide of aluminum.

The amount of the thermostable oxides is not specifically limited and is, for example, such that the total amount of the thermostable oxides falls within a range of 0.5 to 30 parts by weight, and preferably 0.5 to 10 parts by weight, to 1 part by weight of at least one of theta-alumina and alpha-alumina which supports the perovskite-type composite oxide. If the amount of the thermostable oxides is less than the above-specified range, the catalyst may not have sufficiently improved thermostability. If it is more than the above-specified range, the catalyst may comprise an excess amount of thermostable oxides, which may invite disadvantages in cost and production.

The mixing procedure of the thermostable oxides is not specifically limited, as long as it can physically mix the thermostable oxides with at least one of theta-alumina and alpha-alumina supporting the perovskite-type composite oxide. For example, a powder of at least one of theta-alumina and alpha-alumina supporting the perovskite-type composite oxide may be mixed with a powder of the thermostable oxides by dry-mixing or wet-mixing.

The thermostable oxide preferably comprises a thermostable oxide supporting a noble metal. By incorporating the thermostable oxide supporting a noble metal, the resulting catalyst can have a further increased catalytic activity and further improved catalytic performance, in addition to the action of the noble metal contained in the perovskite-type composite oxide containing a noble metal.

Examples of the noble metal herein include Pd, Rh, and Pt, of which Rh and Pt are preferred. These noble metals can be used alone or in combination.

The noble metal can be supported by the thermostable oxide according to a known procedure not specifically limited. It can be supported, for example, by preparing a salt-containing solution comprising the noble metal, impregnating the thermostable oxide with the salt-containing solution and baking the resulting article.

The same as listed above can be used as the salt-containing solution. Practical examples thereof include aqueous nitrate solution, dinitrodiammine nitrate solution, and aqueous chloride solution. More specifically, examples of the palladium salt solution include aqueous palladium nitrate solution, dinitrodiammine palladium nitrate solution, and palladium tetraammine nitrate solution. Examples of the rhodium salt solution include rhodium nitrate solution and rhodium chloride solution. Examples of the platinum salt solution include dinitrodiammine platinum nitrate solution, chloroplatinic acid solution, and platinum tetraammine solution.

After impregnating the thermostable oxide with the noble metal, the resulting article is dried, for example, at 50° C. to 200° C. for 1 to 48 hours and is baked at 350° C. to 1000° C. for 1 to 12 hours.

Alternatively, the noble metal can be supported by the thermostable oxide, for example, in the following manner. When the thermostable oxide is the zirconia composite oxide or the ceria composite oxide, the noble metal is coprecipitated with the respective components of the zirconia composite oxide or the ceria composite oxide by adding a solution of the noble metal salt during coprecipitation or hydrolysis of the salt solution or mixed alkoxide solution containing zirconium, cerium and the alkaline earth metal and/or the rare-earth element, and the coprecipitate is then baked.

Another example of a method for allowing the thermostable oxide to support the noble metal is as follows. When the thermostable oxide is one of the theta-alumina, alpha-alumina, and gamma-alumina, the noble metal is coprecipitated with the theta-alumina, alpha-alumina, or gamma-alumina by adding a solution of the noble metal salt during precipitation (deposition) of the theta-alumina, alpha-alumina, or gamma-alumina from an aqueous aluminum salt solution typically using ammonia in its production process, and the coprecipitate is baked.

When two or more different noble metals are supported, these noble metals may be supported simultaneously in one step or sequentially in plural steps.

The amount of the noble metals is set according to the purpose and use thereof and is, for example, 0.01% to 3.0% by weight, and preferably 0.05% to 1.0% by weight of the total amount of the thermostable oxides.

Examples of the thermostable oxide supporting a noble metal thus prepared include a zirconia composite oxide supporting a noble metal, a ceria composite oxide supporting a noble metal, a theta-alumina supporting a noble metal and a gamma-alumina supporting a noble metal.

The zirconia composite oxide supporting a noble metal is preferably a zirconia composite oxide supporting Pt and/or Rh. In this case, the amount of Pt and/or Rh is 0.01% to 2.0% by weight, and preferably 0.05% to 1.0% by weight of the amount of the zirconia composite oxide.

The ceria composite oxide supporting a noble metal is preferably a ceria composite oxide supporting Pt. In this case, the amount of Pt is 0.01% to 2.0% by weight, and preferably 0.05% to 1.0% by weight of the amount of the ceria composite oxide.

The theta-alumina supporting a noble metal is preferably a theta-alumina supporting Pt and/or Rh. In this case, the amount of Pt and/or Rh is 0.01% to 2.0% by weight, and preferably 0.05% to 1.0% by weight of the amount of the theta-alumina.

The gamma-alumina supporting a noble metal is preferably a gamma-alumina supporting Pt and/or Rh. In this case, the amount of Pt and/or Rh is 0.01% to 2.0% by weight, and preferably 0.05% to 1.0% by weight of the amount of the gamma-alumina.

Of these thermostable oxides each supporting a noble metal, the ceria composite oxide supporting a noble metal is preferred. The use of the ceria composite oxide supporting a noble metal can improve the oxygen storage performance.

The entire thermostable oxide may support the noble metal. Alternatively, the thermostable oxide may comprise both a thermostable oxide supporting the noble metal and a thermostable oxide not supporting the noble metal.

The exhaust gas purifying catalyst obtained by the method of the present invention can constitute, for example, a coating layer on a catalyst carrier. The catalyst carrier can be any of known catalyst carriers such as honeycomb monolith carriers derived from cordierite, without being limited to a particular catalyst carrier.

The coating layer can be formed on the catalyst carrier, for example, in the following manner. Initially, water is added to at least one of theta-alumina and alpha-alumina supporting the perovskite-type composite oxide as well as the thermostable oxide added according to necessity to obtain a slurry. The slurry is then applied to the catalyst carrier, is dried at 50° C. to 200° C. for 1 to 48 hours and is baked at 350° C. to 1000° C. for 1 to 12 hours. Alternatively, the coating layer can be formed by adding water to each of the respective components to obtain slurries, mixing these slurries, applying the resulting slurry mixture to the catalyst carrier, drying at 50° C. to 200° C. for 1 to 48 hours and then baking at 350° C. to 1000° C. for 1 to 12 hours.

The exhaust gas purifying catalyst obtained by the method of the present invention can also be arranged as a multilayer coating layer on the catalyst carrier. The multilayer coating layer comprises an outer layer constituting its surface and an inner layer arranged inside the outer layer.

The inner layer can be prepared by applying the slurry containing the respective components to the catalyst carrier, drying and baking the resulting article, as described above. The outer layer can be prepared by applying the slurry containing the respective components to the inner layer formed on the catalyst carrier, drying and baking the resulting article, as described above.

When the exhaust gas purifying catalyst obtained by the method of the present invention comprises multiple layers, it is preferred that the inner layer comprises the theta-alumina and/or alpha-alumina supporting the perovskite-type composite oxide.

By incorporating at least one of theta-alumina and alpha-alumina supporting the perovskite-type composite oxide into the inner layer, the catalyst can be prevented from poisoning and thermal degradation and can exhibit further improved catalytic performance.

When the exhaust gas purifying catalyst obtained by the method of the present invention comprises the multiple layers as above, at least one of theta-alumina and alpha-alumina supporting the perovskite-type composite oxide can be used alone or in combination. Specifically, for example, at least one of theta-alumina and alpha-alumina supporting the perovskite-type composite oxide can be contained in the inner layer alone or the outer layer alone. In addition, the same or different types of plural theta-alumina and/or alpha-alumina supporting perovskite-type composite oxide may be contained in either one of the inner layer and outer layer or in both of the inner layer and outer layer.

When the exhaust gas purifying catalyst obtained by the method of the present invention comprises the multiple layers, at least one of theta-alumina and alpha-alumina supporting the Pd containing perovskite-type composite oxide is preferably contained in the inner layer. By incorporating at least one of theta-alumina and alpha-alumina supporting the Pd containing perovskite-type composite oxide into the inner layer, the poisoning and thermal degradation of Pd contained in the perovskite-type composite oxide can be prevented, thereby to improve the durability.

When the exhaust gas purifying catalyst obtained by the method of the present invention comprises the multiple layers, at least one of theta-alumina and alpha-alumina supporting the Rh containing perovskite-type composite oxide is preferably contained in the outer layer. By incorporating at least one of theta-alumina and alpha-alumina supporting the Rh containing perovskite-type composite oxide into the outer layer, alloying with Pd can be prevented typically in the case where the Pd containing perovskite-type composite oxide is contained in the inner layer.

When the exhaust gas purifying catalyst obtained by the method of the present invention comprises the multiple layers, at least one of theta-alumina and alpha-alumina supporting the Pt containing perovskite-type composite oxide is preferably contained in the inner layer and/or the outer layer.

When the exhaust gas purifying catalyst obtained by the method of the present invention comprises the multiple layers, it is preferred that the noble metal contained in the outer layer (including the noble metal contained in the perovskite-type composite oxide, and the noble metal supported by the thermostable oxide) is Rh and/or Pt and that the noble metal contained in the inner layer (including the noble metal contained in the perovskite-type composite oxide, and the noble metal supported by the thermostable oxide) is at least Pd. This configuration can prevent the poisoning and thermal degradation of the catalyst by incorporating Pd into the inner layer and can further improve the catalytic performance by the action of Rh and/or Pt contained in the outer layer.

When the exhaust gas purifying catalyst obtained by the method of the present invention comprises the multiple layers, it is preferred that the ceria composite oxide and/or theta-alumina each supporting a noble metal is contained in the inner layer, and that at least two different thermostable oxides selected from the zirconium composite oxide supporting a noble metal, the ceria composite oxide supporting a noble metal, the theta-alumina supporting a noble metal, and the gamma-alumina supporting a noble metal are contained in the outer layer.

More specifically, it is preferred that the inner layer comprises the theta-alumina and the ceria composite oxide supporting Pt and that the outer layer comprises at least one thermostable oxide selected from the group consisting of the zirconia composite oxide supporting Pt and Rh, the ceria composite oxide supporting Pt, and the theta-alumina supporting Pt and Rh.

The exhaust gas purifying catalyst of the present invention may further comprise any of sulfates, carbonates, nitrates, and acetates of Ba, Ca, Sr, Mg, and La. Any of these sulfates, carbonates, nitrates, and acetates is preferably contained in a layer containing Pd, when the catalyst comprises the multiple layers. By incorporating any of the sulfates, carbonates, nitrates, and acetates, the poisoning of Pd typically by the action of hydrocarbons (HC) can be prevented, thereby to avoid decrease in catalytic activity. Of these salts, $BaSO_4$ is preferably used.

The amount of any of these sulfates, carbonates, nitrates, and acetates may be appropriately set depending on the purpose and the use thereof. The sulfate, carbonate, nitrate, and/or acetate can be incorporated into the inner layer and/or the outer layer, for example, by adding the sulfate, carbonate, nitrate, and/or acetate into the slurry for forming the inner layer and/or the outer layer.

The inner layer may comprise multiple layers, according to the purpose and use thereof. The same procedure as above can be applied to form the inner layer as multiple layers.

The exhaust gas purifying catalyst obtained by the method of the present invention thus obtained can allow a noble metal to be stably contained in a perovskite-type composite oxide and, in addition, remarkably increase the thermostability of the perovskite-type composite oxide by the action of at least one of theta-alumina and alpha-alumina because the perovskite-type composite oxide is supported by at least one of theta-alumina and alpha-alumina.

In each perovskite-type composite oxide, the noble metal is finely and highly dispersed, thereby to maintain its high catalytic activity even in long-term use in an atmosphere of high temperature. This is because of the self-regenerative function in which the noble metal repetitively undergoes solid-solution under an oxidative atmosphere and deposition under a reducing atmosphere with respect to the perovskite structure. This self-regenerative function also enables the resulting catalyst to achieve satisfactory catalytic activity even if the amount of the noble metal is significantly reduced.

The perovskite-type composite oxide exhibits increased thermostability by the action of at least one of theta-alumina and alpha-alumina. This prevents the perovskite-type composite oxide from grain growth and a decreased specific surface area in an atmosphere of high temperature of, for example, 900° C. to 1000° C., or further exceeding 1050° C.

Thus, the exhaust gas purifying catalyst obtained by the method of the present invention can maintain the catalytic activity of the noble metal at a high level over a long time and achieve satisfactory exhaust gas purifying performance, even in an atmosphere of high temperature exceeding 900° C. to 1000° C. It can be advantageously used as an exhaust gas purifying catalyst for automobiles.

EXAMPLES

The present invention will be illustrated in further detail with reference to several examples and comparative examples below, which are never intended to limit the scope of the invention.

(1) Production of Zirconia Composite Oxide

Production Example A1

| | |
|---|---|
| Zirconium oxychloride | 16.9 g (0.050 mol) |
| Cerium nitrate | 17.4 g (0.040 mol) |
| Lanthanum nitrate | 2.2 g (0.005 mol) |
| Neodymium nitrate | 2.2 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A1) comprising a $Zr_{0.50}Ce_{0.40}La_{0.05}Nd_{0.05}$ oxide, in which cerium and lanthanum constitute a solid solution.

The powdery zirconia composite oxide was impregnated with a dinitrodiammine platinum nitrate solution, dried at 100° C., further impregnated with a rhodium nitrate solution, dried at 100° C. and baked at 500° C. to obtain a powdery Pt—Rh supporting zirconia composite oxide (Production Example A1-1) supporting 0.27% by weight of Pt and 1.33% by weight of Rh.

Production Example A2

| | |
|---|---|
| Zirconium oxychloride | 25.6 g (0.076 mol) |
| Cerium nitrate | 7.8 g (0.018 mol) |
| Lanthanum nitrate | 1.7 g (0.002 mol) |
| Neodymium nitrate | 1.8 g (0.004 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A2) comprising a $Zr_{0.76}Ce_{0.18}La_{0.02}Nd_{0.04}$ oxide, in which cerium and lanthanum constitute a solid solution.

The powdery zirconia composite oxide was impregnated with a dinitrodiammine platinum nitrate solution, dried at 100° C., further impregnated with a rhodium nitrate solution, dried at 100° C. and baked at 500° C. to obtain a powdery Pt—Rh supporting zirconia composite oxide (Production Example A2-1) supporting 1.00% by weight of Pt and 1.00% by weight of Rh, or a powdery Pt—Rh supporting zirconia composite oxide (Production Example A2-2) supporting 0.27% by weight of Pt and 1.33% by weight of Rh.

Production Example A3

| Zirconium oxychloride | 16.9 g (0.050 mol) |
| Cerium nitrate | 17.4 g (0.040 mol) |
| Lanthanum nitrate | 2.2 g (0.005 mol) |
| Yttrium nitrate | 1.9 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The dried coprecipitate heat treated (calcined) at 800° C. for one hour to obtain a powdery zirconia composite oxide (Production Example A3) comprising a $Zr_{0.50}Ce_{0.40}La_{0.05}Y_{0.05}$ oxide, in which cerium and lanthanum constitute a solid solution.

Production Example A4

| Zirconium oxychloride | 23.6 g (0.070 mol) |
| Cerium nitrate | 10.8 g (0.025 mol) |
| Lanthanum nitrate | 1.7 g (0.002 mol) |
| Neodymium nitrate | 1.3 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The dried coprecipitate heat treated (calcined) at 800° C. for one hour to obtain a powdery zirconia composite oxide (Production Example A4) comprising a $Zr_{0.70}Ce_{0.25}La_{0.02}Nd_{0.03}$ oxide in which cerium and lanthanum constitute a solid solution.

The powdery zirconia composite oxide was impregnated with a dinitrodiammine platinum nitrate solution, dried at 100° C., further impregnated with a rhodium nitrate solution, dried at 100° C. and baked at 500° C. to obtain a powdery Pt—Rh supporting zirconia composite oxide (Production Example A4-1) supporting 0.75% by weight of Pt and 1.25% by weight of Rh.

Production Example A5

| Zirconium oxychloride | 23.6 g (0.070 mol) |
| Cerium nitrate | 10.8 g (0.025 mol) |
| Lanthanum nitrate | 1.7 g (0.002 mol) |
| Yttrium nitrate | 1.1 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The dried coprecipitate heat treated (calcined) at 800° C. for one hour to obtain a powdery zirconia composite oxide (Production Example A5) comprising a $Zr_{0.70}Ce_{0.25}La_{0.02}Y_{0.03}$ oxide in which cerium and lanthanum constitute a solid solution.

Production Example A6

| Zirconium ethoxyethylate | 31.4 g (0.070 mol) |
| Cerium ethoxyethylate | 10.2 g (0.025 mol) |
| Praseodymium ethoxyethylate | 0.8 g (0.002 mol) |
| Neodymium ethoxyethylate | 1.2 g (0.003 mol) |

The above listed components were dissolved in 200 mL of toluene with stirring to obtain a mixed alkoxide solution. The alkoxides were hydrolyzed by adding the mixed alkoxide solution dropwise to 600 mL of deionized water over about ten minutes. The toluene and deionized water were distilled off from the hydrolyzed solution to dryness to obtain a dried product. After being subjected to forced air drying at 60° C. for twenty four hours, the dried product heat treated (baked) in an electric furnace at 800° C. for one hour to obtain a powdery zirconia composite oxide (Production Example A6) comprising a $Zr_{0.70}Ce_{0.25}Pr_{0.02}Nd_{0.03}$ oxide.

(2) Production of Ceria Composite Oxide

Production Example B1

| Cerium methoxypropylate | 24.4 g (0.060 mol) |
| Zirconium methoxypropylate | 13.4 g (0.030 mol) |
| Yttrium methoxypropylate | 3.6 g (0.010 mol) |

The above listed components were dissolved in 200 mL of toluene with stirring to obtain a mixed alkoxide solution. The alkoxides were hydrolyzed by adding 80 mL of deionized water dropwise to the solution. The toluene and deionized water were distilled off from the hydrolyzed solution to dryness to obtain a dried product. After being subjected to forced air drying at 60° C. for twenty four hours, the dried product was baked in an electric furnace at 450° C. for three hours to obtain a powdery ceria composite oxide (Production Example B1) comprising a $Ce_{0.60}Zr_{0.30}Y_{0.10}$ oxide.

The powdery ceria composite oxide was impregnated with a dinitrodiammine platinum nitrate solution, dried at 100° C. and baked at 500° C. to obtain a powdery Pt supporting ceria composite oxide (Production Example B1-1) supporting 1.00% by weight of Pt; a powdery Pt supporting ceria composite oxide (Production Example B1-2) supporting 0.33% by weight of Pt; a powdery Pt supporting ceria composite oxide (Production Example B1-3) supporting 0.67% by weight of Pt; a powdery Pt supporting ceria composite oxide (Production Example B1-4) supporting 1.38% by weight of Pt; or a powdery Pt supporting ceria composite oxide (Production Example B1-5) supporting 1.50% by weight of Pt.

Production Example B2

| Cerium methoxypropylate | 12.2 g (0.030 mol) |
| Zirconium methoxypropylate | 31.5 g (0.070 mol) |

The above listed components were dissolved in 200 mL of toluene with stirring to obtain a mixed alkoxide solution. The alkoxides were hydrolyzed by adding 80 mL of deionized water dropwise to the solution. The toluene and deionized water were distilled off from the hydrolyzed solution to dryness to obtain a dried product. After being subjected to forced air drying at 60° C. for twenty four hours, the dried product was baked in an electric furnace at 300° C. for three hours to obtain a powdery $Ce_{0.30}Zr_{0.70}O_2$ ceria composite oxide (Production Example B2).

The powdery ceria composite oxide was impregnated with a dinitrodiammine platinum nitrate solution, dried at 100° C., further impregnated with a rhodium nitrate solution, dried at 100° C. and baked at 500° C. to obtain a powdery Pt—Rh supporting ceria composite oxide (Production Example B2-1) supporting 2.00% by weight of Pt and 1.00% by weight of Rh.

(3) Production of Theta-Alumina

Production Example C1

| Aluminum methoxyethylate | 60.6 g (0.240 mol) |
| Lanthanum methoxyethylate | 0.55 g (0.0015 mol) |

The above listed components were charged in a 500 mL round bottomed flask, dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a mixture of AlLa composite oxides. Next, the mixture was placed on a petri dish, subjected to forced air drying at 60° C. for twenty four hours and heat treated in an electric furnace at 1000° C. in the air for four hours to obtain a powdery lanthanum containing theta-alumina (Production Example C1) containing 2.0% by weight of lanthanum in terms of $La_2O_3$.

Production Example C2

| Aluminum methoxyethylate | 59.4 g (0.236 mol) |
| Lanthanum methoxyethylate | 1.1 g (0.003 mol) |

The above listed components were charged in a 500 mL round bottomed flask, dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a mixture of AlLa composite oxides. Next, the mixture was placed on a petri dish, subjected to forced air drying at 60° C. for twenty four hours and heat treated in an electric furnace at 1000° C. in the air for four hours to obtain a powdery lanthanum containing theta-alumina (Production Example C2) containing 4.0% by weight of lanthanum in terms of $La_2O_3$.

Production Example C3

| Aluminum methoxyethylate | 44.6 g (0.177 mol) |
| Lanthanum methoxyethylate | 2.2 g (0.006 mol) |

The above listed components were charged in a 500 mL round bottomed flask, dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a mixture of AlLa composite oxides. Next, the mixture was placed on a petri dish, subjected to forced air drying at 60° C. for twenty four hours and heat treated in an electric furnace at 1000° C. in the air for four hours to obtain a powdery lanthanum containing theta-alumina (Production Example C3) containing 10.0% by weight of lanthanum in terms of $La_2O_3$.

Production Example C4

| Aluminum methoxyethylate | 59.4 g (0.236 mol) |
| Barium methoxyethylate | 0.95 g (0.0033 mol) |

The above listed components were charged in a 500 mL round bottomed flask, dissolved in 300 mL of toluene with stirring to obtain a homogeneous AlBa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a mixture of AlBa composite oxides. Next, the mixture was placed on a petri dish, subjected to forced air drying at 60° C. for twenty four hours and heat treated in an electric furnace at 1000° C. in the air for four hours to obtain a powdery barium containing theta-alumina (Production Example C4) containing 4.0% by weight of barium in terms of BaO.

Production Example C5

A powdery theta-alumina (having a specific surface area of 98.4 m²/g, the same is true hereafter) was impregnated with dinitrodiammine platinum nitrate solution, dried at 100° C. and baked at 500° C. to obtain a Pt supporting theta-alumina (Production Example C5) supporting 0.31% by weight of Pt.

Production Example C6

The powdery theta-alumina was impregnated with a dinitrodiammine platinum nitrate solution, dried at 100° C., further impregnated with a rhodium nitrate solution, dried at 100° C. and baked at 500° C. to obtain a powdery Pt—Rh supporting theta-alumina (Production Example C6-1) supporting 0.57% by weight of Pt and 0.14% by weight of Rh; a powdery Pt—Rh supporting theta-alumina (Production Example C6-2) supporting 0.43% by weight of Pt and 0.21% by weight of Rh; or a powdery Pt—Rh supporting theta-alumina (Production Example C6-3) supporting 1.50% by weight of Pt and 0.67% by weight of Rh.

Production Example C7

The powdery theta-alumina was impregnated with a palladium nitrate solution, dried at 100° C. and baked at 500° C. to obtain a powdery Pd supporting theta-alumina (Production Example C7) supporting 1.10% by weight of Pd.

(4) Production of Gamma-Alumina

Production Example D1

A powdery gamma-alumina (having a specific surface area of 200 m²/g, the same is true hereinafter) was impregnated with a dinitrodiammine platinum nitrate solution, dried at 100° C., further impregnated with a rhodium nitrate solution, dried at 100° C. and baked at 500° C. to obtain a powdery Pt—Rh supporting gamma-alumina (Production Example D1) supporting 1.00% by weight of Pt and 0.57% by weight of Rh.

Example QA-1

| Lanthanum nitrate | 43.3 g (0.100 mol) |
| Iron nitrate | 38.4 g (0.095 mol) |

Aqueous palladium nitrate solution (Pd content of 4.399% by mass) 12.1 g (corresponding to 0.53 g (0.005 mol) of Pd)

The above listed components were dissolved in 200 mL of deionized water to obtain an aqueous mixed salt solution. Next, 73.4 g of the powdery theta-alumina was mixed with the aqueous mixed salt solution with stirring, and an aqueous ammonium carbonate solution was added dropwise thereto until the aqueous mixed salt solution had a pH of 10, to form a coprecipitate. After being stirred for one hour, the coprecipitate was filtrated, was fully washed with water, subjected to forced air drying at 120° C. for twelve hours, baked at 700° C. in the air for three hours to obtain a powdery exhaust gas purifying catalyst comprising the theta-alumina supporting a $La_{1.00}Fe_{0.95}Pd_{0.05}O_3$ perovskite-type composite oxide.

The resulting powder was prepared so as to have a weight ratio of the perovskite-type composite oxide to the theta-alumina of 1:3.

Example QA-2

| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 20 mL of toluene, the resulting solution was added to the mixed alkoxide solution in the round bottomed flask to obtain a homogeneous mixed solution containing LaFePd.

Next, 98.0 g of the powdery lanthanum containing theta-alumina (containing 4.0% by weight of $La_2O_3$) (Production Example C2) was mixed with the homogeneous mixed solution with stirring, and 200 mL of deionized water was added dropwise thereto over about fifteen minutes. As a result, a brown viscous precipitate was formed upon hydrolysis.

After stirring at room temperature for two hours, the toluene and water were distilled off under reduced pressure to obtain a mixture of a pre-crystallization composition of a LaFePd containing perovskite-type composite oxide homogeneously dispersed in the lanthanum containing theta-alumina. Next, the mixture was placed on a petri dish, subjected to forced air drying at 60° C. for twenty four hours and heat treated in an electric furnace at 800° C. in the air for one hour to obtain a powdery exhaust gas purifying catalyst comprising the lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:4.

Example QA-3

| Lanthanum methoxypropylate | 40.6 g (0.100 mol) |
| Iron methoxypropylate | 30.7 g (0.095 mol) |

The above listed components were charged in 1000 mL round bottomed flask, dissolved in 200 mL of toluene with stirring to obtain a mixed alkoxide solution. Separately, 1.52 g (0.005 mol) of palladium acetylacetonate was dissolved in 20 mL of toluene, the resulting solution was added to the mixed alkoxide solution in the round bottomed flask to obtain a homogeneous mixed solution containing LaFePd.

The homogeneous mixed solution was hydrolyzed by adding 200 mL of deionized water dropwise thereto over about fifteen minutes. The resulting brown slurry was mixed with 24.5 g of the powdery lanthanum containing theta-alumina (containing 4.0% by weight of $La_2O_3$) (Production Example C2) with stirring at room temperature for two hours. Subsequently, the toluene and water were distilled off under reduced pressure, thereby to obtain a mixture of a pre-crystallization composition of a LaFePd containing perovskite-type composite oxide homogeneously dispersed in the lanthanum containing theta-alumina.

Next, the mixture was placed on a petri dish, subjected to forced air drying at 60° C. for twenty four hours and heat treated in an electric furnace at 800° C. in the air for one hour to obtain a powdery exhaust gas purifying catalyst comprising the lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

Example QA-4

| | |
|---|---|
| Lanthanum methoxypropylate | 40.6 g (0.100 mol) |
| Iron methoxypropylate | 18.4 g (0.057 mol) |
| Manganese methoxypropylate | 8.9 g (0.038 mol) |

The above listed components were charged in a 1000 mL round bottomed flask, dissolved in 200 mL of toluene with stirring to obtain a mixed alkoxide solution. Separately, 2.00 g (0.005 mol) of rhodium acetylacetonate was dissolved in 20 mL of toluene, the resulting solution was added to the mixed alkoxide solution in the round bottomed flask to obtain a homogeneous mixed solution containing LaFeMnRh.

The homogeneous mixed solution was hydrolyzed by adding 300 mL of deionized water dropwise thereto over about fifteen minutes. After stirring at room temperature for two hours, the toluene and water were distilled off under reduced pressure, thereby to obtain a pre-crystallization composition of a LaFeMnRh containing perovskite-type composite oxide. The pre-crystallization composition of LaFeMnRh containing perovskite-type composite oxide was charged in a 1000 mL round bottomed flask, was mixed with 200 mL of IPA (isopropyl alcohol) with stirring to obtain a slurry.

The resulting slurry was mixed with 220 g of the powdery lanthanum containing theta-alumina (containing 2.0% by weight of $La_2O_3$) (Production Example C1) with stirring at room temperature for one hour, IPA was distilled off therefrom under reduced pressure, thereby to obtain a mixture of a pre-crystallization composition of a LaFeMnRh containing perovskite-type composite oxide homogeneously dispersed in the lanthanum containing theta-alumina.

Next, the mixture was placed on a petri dish, subjected to forced air drying at 60° C. for twenty four hours and heat treated in an electric furnace at 800° C. in the air for one hour to obtain a powdery exhaust gas purifying catalyst comprising the lanthanum containing theta-alumina supporting a $La_{1.00}Fe_{0.57}Mn_{0.38}Rh_{0.05}O_3$ perovskite-type composite oxide.

The resulting powder was prepared so as to have a weight ratio of the perovskite-type composite oxide to the lanthanum containing theta-alumina of 1:9.

Example QA-5

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 2.00 g (0.005 mol) of rhodium acetylacetonate was dissolved in 20 mL of toluene, the resulting solution was added to the mixed alkoxide solution in the round bottomed flask to obtain a LaFeRh containing homogeneous mixed solution.

Next, 36.8 g of the powdery lanthanum containing theta-alumina (containing 10.0% by weight of $La_2O_3$) (Production Example C3) was mixed with the homogeneous mixed solution with stirring, and 200 mL of deionized water was added dropwise thereto over about fifteen minutes. As a result, a brown viscous precipitate was formed upon hydrolysis.

After stirring at room temperature for two hours, the toluene and water were distilled off under reduced pressure thereby to obtain a mixture of a pre-crystallization composition of a LaFeRh containing perovskite-type composite oxide homogeneously dispersed in the lanthanum containing theta-alumina. Next, the mixture was placed on a petri dish, subjected to forced air drying at 60° C. for twenty four hours and heat treated in an electric furnace at 800° C. in the air for one hour to obtain a powdery exhaust gas purifying catalyst comprising the lanthanum containing theta-alumina supporting a $La_{1.00}Fe_{0.95}Rh_{0.05}O_3$ perovskite-type composite oxide.

The resulting powder was prepared so as to have a weight ratio of the perovskite-type composite oxide to the lanthanum containing theta-alumina of 2:3.

Example QA-6

| | |
|---|---|
| Lanthanum methoxypropylate | 38.6 g (0.095 mol) |
| Iron methoxypropylate | 18.4 g (0.057 mol) |
| Manganese methoxypropylate | 8.9 g (0.038 mol) |

The above listed components were charged in a 1000 mL round bottomed flask, dissolved in 200 mL of toluene with stirring to obtain a mixed alkoxide solution. Separately, 1.965 g (0.005 mol) of platinum acetylacetonate and 1.53 g (0.005 mol) of silver acetylacetonate dissolved in 40 mL of toluene, the resulting solution was added to the mixed alkoxide solution in the round bottomed flask to obtain a LaAgFeMnPt containing homogeneous mixed solution.

Next, 24.5 g of the powdery lanthanum containing theta-alumina (containing 10.0% by weight of $La_2O_3$) (Production Example C3) was added to the homogeneous mixed solution with stirring, and 200 mL of deionized water was added dropwise thereto over about fifteen minutes. As a result, a brown viscous precipitate was formed upon hydrolysis.

After stirring at room temperature for two hours, the toluene and water were distilled off under reduced pressure, thereby to obtain a mixture of a pre-crystallization composition of a LaAgFeMnPt containing perovskite-type composite oxide homogeneously dispersed in the lanthanum containing theta-alumina. Next, the mixture was placed on a petri dish, subjected to forced air drying at 60° C. for twenty four hours and heat treated in an electric furnace at 800° C. in the air for one hour to obtain a powdery exhaust gas purifying catalyst comprising the lanthanum containing theta-alumina supporting a $La_{0.95}Ag_{0.05}Fe_{0.57}Mn_{0.38}Pt_{0.05}O_3$ perovskite-type composite oxide.

The resulting powder was prepared so as to have a weight ratio of the perovskite-type composite oxide to the lanthanum containing theta-alumina of 1:1.

Example QA-7

| | |
|---|---|
| Lanthanum methoxypropylate | 36.6 g (0.090 mol) |
| Calcium methoxypropylate | 2.2 g (0.010 mol) |
| Iron methoxypropylate | 29.1 g (0.090 mol) |

The above listed components were charged in a 1000 mL round bottomed flask, dissolved in 200 mL of toluene with stirring to obtain a mixed alkoxide solution. Separately, 3.93 g (0.010 mol) of platinum acetylacetonate was dissolved in 40 mL of toluene, the resulting solution was added to the mixed alkoxide solution in the round bottomed flask to obtain a LaCaFePt containing homogeneous mixed solution.

Next, 98.7 g of the powdery theta-alumina was mixed with the homogeneous mixed solution with stirring, and 200 mL of deionized water was added dropwise thereto over about fifteen minutes. As a result, a brown viscous precipitate was formed upon hydrolysis.

After stirring at room temperature for two hours, the toluene and water were distilled off under reduced pressure, thereby to obtain a mixture of a pre-crystallization composition of a LaCaFePt containing perovskite-type composite oxide homogeneously dispersed in the theta-alumina. Next, the mixture was placed on a petri dish, subjected to forced air drying at 60° C. for twenty four hours and heat treated in an electric furnace at 800° C. in the air for one hour to obtain a powdery exhaust gas purifying catalyst comprising the theta-alumina supporting a $La_{0.09}Ca_{0.10}Fe_{0.90}Pt_{0.10}O_3$ perovskite-type composite oxide.

The resulting powder was prepared so as to have a weight ratio of the perovskite-type composite oxide to the theta-alumina of 1:4.

Example QA-7-1

| | |
|---|---|
| Lanthanum nitrate | 43.3 g (0.100 mol) |
| Iron nitrate | 36.4 g (0.090 mol) |

The above listed components were charged in a 1000 mL round bottomed flask, were homogeneously dissolved in 100 mL of deionized water to obtain an aqueous mixed salt solution. Next, 47.9 g (0.23 mol) of citric acid was dissolved in 100 mL of deionized water, the resulting solution was added to the aqueous mixed salt solution to obtain a LaFe containing aqueous citrate mixed salt solution.

Next, the aqueous citrate mixed salt solution was evaporated to dryness in a hot water bath at 60° C. to 80° C. while evacuating with a rotary evaporator. At the time when the solution became viscous syrup after about three hour, the temperature of the hot water bath was gradually raised, followed by vacuum drying at 300° C. for one hour, thereby to obtain a citrate complex.

The citrate complex was crushed in a mortar, baked at 350° C. in the air for three hours and was placed again in the 1000 mL flask.

Separately, 3.05 g (0.010 mol) of palladium acetylacetonate was dissolved in 200 mL of acetone, was charged in the round bottomed flask, followed by stirring, thereby to obtain a LaFePd containing homogenous mixed slurry.

Next, the acetone was distilled off from the homogeneous mixed slurry to dryness. Separately, 24.5 g of the powdery lanthanum containing theta-alumina (containing 4.0% by weight of $La_2O_3$) (Production Example C2) was dispersed in 100 mL of deionized water, and the resulting dispersion was charged in the round bottomed flask, followed by stirring.

After stirring at room temperature for two hours, the water was distilled off under reduced pressure, thereby to obtain a mixture of a pre-crystallization composition of a LaFePd containing perovskite-type composite oxide homogeneously dispersed in the lanthanum containing theta-alumina. Next, the lanthanum containing theta-alumina containing the dispersed pre-crystallization composition was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.90}Pd_{0.10}O_3$ perovskite-type composite oxide.

The resulting powder was prepared so as to have a weight ratio of the perovskite-type composite oxide to the lanthanum containing theta-alumina of 1:1.

Example QA-7-2

| | |
|---|---|
| Lanthanum chloride | 37.1 g (0.100 mol) |
| Iron chloride | 21.6 g (0.080 mol) |

The above listed components were charged in a 1000 mL round bottomed flask, dissolved in 200 mL of deionized water to obtain an aqueous mixed salt solution. Separately, 208 g of ammonium carbonate (containing 30% by weight of $NH_3$) was dissolved in 200 mL of deionized water to obtain an alkaline aqueous solution. The aqueous mixed salt solution was gradually added dropwise thereto to form a coprecipitate. The reaction mixture was stirred at room temperature for two hours, and the resulting coprecipitate was fully washed with water and filtrated.

Next, the coprecipitate was placed on a petri dish, was fully dried by forced air drying at 80° C. for twelve hours, was crushed in a mortar and was placed again in the 1000 mL flask.

Separately, 6.09 g (0.020 mol) of palladium acetylacetonate was dissolved in 400 mL of acetone, the resulting solution was charged in the round bottomed flask, followed by stirring, thereby to obtain a LaFePd containing homogenous mixed slurry.

Next, the acetone was distilled off from the homogeneous mixed slurry to dryness. Separately, 24.5 g of the powdery lanthanum containing theta-alumina (containing 4.0% by weight of $La_2O_3$) (Production Example C2) was dispersed in 100 mL of deionized water and the dispersion was charged in the round bottomed flask, followed by stirring.

After stirring at room temperature for two hours, the water was distilled off under reduced pressure, thereby to obtain a mixture of a pre-crystallization composition of a LaFePd containing perovskite-type composite oxide homogeneously dispersed in the lanthanum containing theta-alumina. Next, the lanthanum containing theta-alumina containing the dispersed pre-crystallization composition was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.09}Pd_{0.10}O_3$ perovskite-type composite oxide.

The resulting powder was prepared so as to have a weight ratio of the perovskite-type composite oxide to the lanthanum containing theta-alumina of 1:1.

Example RA-8

1) Supporting of Palladium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 20 mL of toluene, the resulting solution was added to the mixed alkoxide solution in the round bottomed flask to obtain a LaFePd containing homogeneous mixed solution.

Separately, the powdery lanthanum containing theta-alumina (containing 4.0% by weight of $La_2O_3$) (Production Example C2) was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a lanthanum containing theta-alumina containing a pre-crystallization composition of a LaFePd composite oxide dispersed therein. Next, the lanthanum containing theta-alumina containing the dispersed pre-crystallization composition was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

2) Mixing of Perovskite-Type Composite Oxide with Thermostable Oxide and Production of Exhaust Gas Purifying Catalyst To the above prepared powdery lanthanum containing theta-alumina supporting the perovskite-type composite oxide were added the powdery Pt—Rh supporting zirconia composite oxide (Production Example A2-1) comprising a $Zr_{0.76}Ce_{0.18}La_{0.02}Nd_{0.04}$ oxide supporting 1.00% by weight of Pt and 1.00% by weight of Rh, the powdery Pt supporting ceria composite oxide (Production Example B1-1) comprising a $Ce_{0.60}Zr_{0.30}Y_{0.10}$ oxide supporting 1.00% by weight of Pt, and the powdery Pt—Rh supporting theta-alumina (Production Example C6-1) comprising the theta-alumina supporting 0.57% by weight of Pt and 0.14% by weight of Rh. The mixture was mixed with deionized water, was further mixed with alumina sol to obtain a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the perovskite-type composite oxide, 30 g of the Pt—Rh supporting zirconia composite oxide, 80 g of the Pt supporting ceria composite oxide, and 70 g of the Pt—Rh supporting theta-alumina per one liter of the honeycomb carrier. The resulting article dried at 100° C. and baked at 500° C. to obtain an exhaust gas purifying catalyst. The exhaust gas purifying catalyst contained 1.50 g of Pt, 0.33 g of Pd, and 0.40 g of Rh per one liter of the honeycomb carrier.

Example RA-9

1) Supporting of Palladium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 20 mL of toluene, the resulting solution was added to the mixed alkoxide solution in the round bottomed flask to obtain a LaFePd containing homogeneous mixed solution.

The homogeneous mixed solution was hydrolyzed by adding 200 mL of deionized water dropwise thereto over about fifteen minutes. The resulting brown slurry was mixed with a dispersion of 24.5 g of the powdery lanthanum containing theta-alumina (containing 4.0% by weight of $La_2O_3$) (Production Example C2) in 100 mL of deionized water. After stirring at room temperature for two hours, the toluene and water were distilled off under reduced pressure, thereby to obtain a mixture of a pre-crystallization composition of a LaFePd containing perovskite-type composite oxide homogeneously dispersed in the lanthanum containing theta-alumina.

Next, the lanthanum containing theta-alumina containing the dispersed pre-crystallization composition (mixture) was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

2) Mixing of Zirconia Composite Oxide Supporting Perovskite-Type Composite Oxide with Thermostable Oxide and Production of Exhaust Gas Purifying Catalyst To the above prepared powdery lanthanum containing theta-alumina supporting the perovskite-type composite oxide were added the powdery Pt supporting ceria composite oxide (Production Example B1-1) comprising a $Ce_{0.60}Zr_{0.30}Y_{0.10}$ oxide supporting 1.00% by weight of Pt, and the powdery Pt—Rh supporting gamma-alumina (Production Example D1) comprising a gamma-alumina supporting 1.00% by weight of Pt and 0.57% by weight of Rh. The resulting mixture was mixed with deionized water and was then mixed with alumina sol to form a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the perovskite-type composite oxide, 80 g of the Pt supporting ceria composite oxide, and 70 g of the Pt—Rh supporting gamma-alumina per one liter of the honeycomb carrier. The resulting article dried at 100° C. and baked at 500° C. to obtain an exhaust gas purifying catalyst. The exhaust gas purifying catalyst contained 1.50 g of Pt, 0.33 g of Pd, and 0.40 g of Rh per one liter of the honeycomb carrier.

Example RA-9-1

1) Supporting of Palladium Containing Perovskite-Type Composite Oxide by Thermostable Oxide

| Lanthanum methoxypropylate | 40.6 g (0.100 mol) |
|---|---|
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 20 mL of toluene, the resulting solution was added to the mixed alkoxide solution in the round bottomed flask to obtain a LaFePd containing homogeneous mixed solution.

A powdery alpha-alumina was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of alpha-alumina containing a dispersed pre-crystallization composition of a LaFePd composite oxide. Next, the alpha-alumina with the dispersed pre-crystallization composition (mixture) was placed on a petri dish, subjected to forced air drying at 60° C. for twenty four hours and heat treated in an electric furnace at 800° C. in the air for one hour to obtain a powdery alpha-alumina supporting a $La_{1.00}Fe_{0.95}Pd_{0.05}O_3$ perovskite-type composite oxide.

The resulting powder was prepared so as to have a weight ratio of the perovskite-type composite oxide to the alpha-alumina of 1:2.

2) Mixing of Perovskite-Type Composite Oxide with Thermostable Oxide and Production of Exhaust Gas Purifying Catalyst To the powdery alpha-alumina supporting the perovskite-type composite oxide were added the powdery Pt—Rh supporting zirconia composite oxide (Production Example A2-1) comprising a $Zr_{0.76}Ce_{0.18}La_{0.02}Nd_{0.04}$ oxide supporting 1.00% by weight of Pt and 1.00% by weight of Rh, the powdery Pt supporting ceria composite oxide (Production Example B1-4) comprising a $Ce_{0.60}Zr_{0.30}Y_{0.10}$ oxide supporting 1.38% by weight of Pt, and a powdery gamma-alumina. The resulting mixture was mixed with deionized water and was then mixed with alumina sol to form a slurry. The slurry was charged into a honeycomb cordierite carrier having a size of 3 mil per 600 cells, a diameter of 86 mm and a length of 104 mm so as to homogeneously apply 45 g of the alpha-alumina supporting the perovskite-type composite oxide, 40 g of the Pt—Rh supporting zirconia composite oxide, 80 g of the Pt supporting ceria composite oxide, and 70 g of the gamma-alumina per one liter of the honeycomb carrier. The resulting article dried at 100° C. and baked at 500° C. to obtain an exhaust gas purifying catalyst. The exhaust gas purifying catalyst contained 1.50 g of Pt, 0.33 g of Pd, and 0.40 g of Rh per one liter of the honeycomb carrier.

Example RC-10

1) Formation of Inner Layer

1) -1 Supporting of Palladium Containing Perovskite-Type Composite Oxide by Thermostable Oxide

| Lanthanum methoxypropylate | 40.6 g (0.100 mol) |
|---|---|
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

Separately, the powdery lanthanum containing theta-alumina (containing 4.0% by weight of $La_2O_3$) (Production Example C2) was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a lanthanum containing theta-alumina with a dispersed pre-crystallization composition of a LaFePd composite oxide. Next, the lanthanum containing theta-alumina with the dispersed pre-crystallization composition (mixture) was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

1) -2 Production of Inner Layer

To the above prepared powdery lanthanum containing theta-alumina supporting the palladium containing perovskite-type composite oxide were added the powdery Pt supporting ceria composite oxide (Production Example B1-2) comprising a $Ce_{0.60}Zr_{0.30}Y_{0.10}$ oxide supporting 0.33% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 28 g of the lanthanum containing theta-alumina supporting the palladium containing perovskite-type composite oxide, 60 g of the Pt supporting ceria composite oxide, and 70 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A2-2) comprising a $Zr_{0.76}Ce_{0.18}La_{0.02}Nd_{0.04}$ oxide supporting 0.27% by weight of Pt and 1.33% by weight of Rh, the powdery Pt supporting ceria composite oxide (Production Example B1-2) comprising a $Ce_{0.60}Zr_{0.30}Y_{0.10}$ oxide supporting 0.33% by weight of Pt, and the powdery Pt supporting theta-alumina (Production Example C5) comprising the theta-alumina supporting 0.31% by weight of Pt were mixed. The resulting mixture was further mixed with deionized water and then mixed with alumina sol to form a slurry. The slurry was charged into the honeycomb cordierite carrier having a size of 3 mil per 600 cells, a diameter of 86 mm and a length of 104 mm so as to homogeneously apply, to a surface of the inner layer, 30 g of the Pt—Rh supporting zirconia composite oxide, 60 g of the Pt supporting ceria composite oxide, and 70 g of the Pt supporting theta-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.10 g of Pt and 0.30 g of Pd in the inner layer, and 0.50 g of Pt and 0.40 g of Rh in the outer layer, respectively, per one liter of the honeycomb carrier.

Example RC-11

1) Formation of Inner Layer

1)-1 Supporting of Palladium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

The homogeneous mixed solution was hydrolyzed by adding 200 mL of deionized water dropwise thereto over about fifteen minutes. The resulting brown slurry was mixed with a dispersion of 24.5 g of the powdery lanthanum containing theta-alumina (containing 4.0% by weight of $La_2O_3$) (Production Example C2) in 100 mL of deionized water. After stirring at room temperature for two hours, the toluene and water were distilled off under reduced pressure, thereby to obtain a mixture of a pre-crystallization composition of a LaFePd containing perovskite-type composite oxide homogeneously dispersed in the lanthanum containing theta-alumina.

Next, the lanthanum containing theta-alumina with the dispersed pre-crystallization composition (mixture) was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

1)-2 Production of Inner Layer

To the above prepared powdery lanthanum containing theta-alumina supporting the palladium containing perovskite-type composite oxide were added the powdery Pt supporting ceria composite oxide (Production Example B1-3) comprising a $Ce_{0.60}Zr_{0.30}Y_{0.10}$ oxide supporting 0.67% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the palladium containing perovskite-type composite oxide, 30 g of the Pt supporting ceria composite oxide, and 80 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A1-1) comprising a $Zr_{0.50}Ce_{0.40}La_{0.05}Nd_{0.05}$ oxide supporting 0.27% by weight of Pt and 1.33% by weight of Rh was mixed with the powdery Pt supporting ceria composite oxide (Production Example B1-2) comprising a $Ce_{0.60}Zr_{0.30}Y_{0.10}$ oxide supporting 0.33% by weight of Pt, and the powdery Pt—Rh supporting theta-alumina (Production Example C6-2) comprising a theta-alumina supporting 0.43% by weight of Pt and 0.21% by weight of Rh. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm, thereby to homogeneously apply, to a surface of the inner layer, 30 g of the Pt—Rh supporting zirconia composite oxide, 60 g of the Pt supporting ceria composite oxide, and 70 g of the Pt—Rh supporting theta-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.20 g of Pt and 0.33 g of Pd in the inner layer, and 0.58 g of Pt and 0.55 g of Rh in the outer layer, respectively, per one liter of the honeycomb carrier.

Example RC-12

1) Formation of Inner Layer

1)-1 Supporting of Palladium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

Separately, the powdery barium containing theta-alumina (containing 4.0% by weight of BaO) (Production Example C4) was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a barium containing theta-alumina with a dispersed pre-crystallization composition of a LaFePd composite oxide. Next, the barium containing theta-alumina with the dispersed pre-crystallization composition (mixture) was placed on a petri dish, subjected to forced air drying at 60° C. for twenty four hours and heat treated in an electric furnace at 650° C. in the air for one hour to obtain a powdery barium containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the barium containing theta-alumina of 1:4.

1) -2 Production of Inner Layer

To the above prepared powdery barium containing theta-alumina supporting the palladium containing perovskite-type composite oxide was added the powdery Pt supporting ceria composite oxide (Production Example B1-3) comprising a $Ce_{0.60}Zr_{0.30}Y_{0.10}$ oxide supporting 0.67% by weight of Pt. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 46 g of the barium containing theta-alumina supporting the palladium containing perovskite-type composite oxide and 45 g of the Pt supporting ceria composite oxide per one liter of the honeycomb carrier. The resulting article dried at 100° C. and baked at 500° C. to form an inner layer.

2) Formation of Outer Layer

2) -1 Supporting of Rhodium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 2.00 g (0.005 mol) of rhodium acetylacetonate was dissolved in 100 mL of toluene, the resulting solution was added to the mixed alkoxide solution in the round bottomed flask to obtain a LaFeRh containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a theta-alumina with a dispersed pre-crystallization composition of a LaFePd composite oxide. Next, the theta-alumina with the dispersed pre-crystallization composition (mixture) was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.95}Rh_{0.05}O_3$ perovskite-type composite oxide.

The resulting powder was prepared so as to have a weight ratio of the perovskite-type composite oxide to the theta-alumina of 1:3.

2) -2 Production of Outer Layer and Exhaust Gas Purifying Catalyst

To the above prepared powdery theta-alumina supporting the rhodium containing perovskite-type composite oxide was added the powdery Pt supporting ceria composite oxide (Production Example B1-3) comprising a $Ce_{0.60}Zr_{0.30}Y_{0.10}$ oxide supporting 0.67% by weight of Pt. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply, to a surface of the inner layer, 38 g of the theta-alumina supporting the rhodium containing perovskite-type composite oxide and 60 g of the Pt supporting ceria composite oxide per one liter of the honeycomb carrier. The resulting article dried at 100° C. and baked at 500° C. to form an outer layer. Thus, an exhaust gas purifying catalyst was produced.

The exhaust gas purifying catalyst contained 0.30 g of Pt and 0.20 g of Pd in the inner layer, and 0.40 g of Pt and 0.20 g of Rh in the outer layer, respectively, per one liter of the honeycomb carrier.

Example RC-13

1) Formation of Inner Layer

1) -1 Supporting of Palladium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

To the homogeneous mixed solution was added 200 mL of deionized water dropwise over about fifteen minutes. After stirring at room temperature for two hours, the toluene and water were distilled off under reduced pressure, thereby to obtain a pre-crystallization composition of a LaFePd containing perovskite-type composite oxide. The pre-crystallization composition of LaFePd containing perovskite-type composite oxide was charged in a 1000 mL round bottomed flask and was mixed with 200 mL of IPA (isopropyl alcohol) with stirring to form a slurry. The resulting slurry was mixed with 24.5 g of a powdery alpha-alumina, was stirring at room temperature for one hour, and IPA was distilled off under reduced pressure, thereby to obtain a mixture of a pre-crystallization composition of a LaFePd containing perovskite-type composite oxide homogeneously dispersed in the alpha-alumina.

Next, the alpha-alumina with the dispersed pre-crystallization composition (mixture) was placed on a petri dish, subjected to forced air drying at 60° C. for twenty four hours and heat treated in an electric furnace at 650° C. in the air for one hour to obtain a powdery alpha-alumina supporting a $La_{1.00}Fe_{0.95}Pd_{0.05}O_3$ perovskite-type composite oxide.

The resulting powder was prepared so as to have a weight ratio of the perovskite-type composite oxide to the alpha-alumina of 2:3.

1) -2 Production of Inner Layer

To the above prepared powdery alpha-alumina supporting the palladium containing perovskite-type composite oxide were added the powdery Pt supporting ceria composite oxide (Production Example B1-2) comprising a $Ce_{0.60}Zr_{0.30}Y_{0.10}$ oxide supporting 0.33% by weight of Pt and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 40 g of the alpha-alumina supporting the palladium containing perovskite-type composite oxide, 30 g of the Pt supporting ceria composite oxide, and 80 g of the theta-alumina per one liter of the honeycomb carrier. The resulting article dried at 100° C. and baked at 500° C. to form an inner layer.

2) Formation of Outer Layer

2) -1 Supporting of Platinum Containing Perovskite-Type Composite Oxide by Thermostable Oxide

| Lanthanum methoxypropylate | 38.6 g (0.090 mol) |
|---|---|
| Calcium methoxypropylate | 2.2 g (0.010 mol) |
| Iron methoxypropylate | 29.1 g (0.090 mol) |

The above listed components were charged in a 1000 mL round bottomed flask, dissolved in 200 mL of toluene with stirring to obtain a mixed alkoxide solution. Separately, 3.93 g (0.010 mol) of platinum acetylacetonate was dissolved in 40 mL of toluene, the resulting solution was added to the mixed alkoxide solution in the round bottomed flask to obtain a LaCaFePt containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a theta-alumina with a dispersed pre-crystallization composition of a LaCaFePt composite oxide. Next, the theta-alumina with the dispersed pre-crystallization composition (mixture) was placed on a petri dish, subjected to forced air drying at 60° C. for twenty four hours and heat treated in an electric furnace at 650° C. in the air for one hour to obtain a powdery theta-alumina supporting a $La_{0.90}Ca_{0.10}Fe_{0.90}Pt_{0.10}O_3$ perovskite-type composite oxide.

The resulting powder was prepared so as to have a weight ratio of the perovskite-type composite oxide to the theta-alumina of 2:3.

2) -2 Production of Outer Layer and Exhaust Gas Purifying Catalyst

To the above prepared powdery theta-alumina supporting the platinum containing perovskite-type composite oxide were added the powdery Pt—Rh supporting zirconia composite oxide (Production Example A4-1) comprising a $Zr_{0.70}Ce_{0.25}La_{0.02}Nd_{0.03}$ oxide supporting 0.75% by weight of Pt and 1.25% by weight of Rh, and the powdery Pt supporting ceria composite oxide (Production Example B1-2) comprising a $Ce_{0.60}Zr_{0.30}Y_{0.10}$ oxide supporting 0.33% by weight of Pt. The resulting mixture was further mixed with deionized water and then mixed with alumina sol to form a slurry. The slurry was charged into a honeycomb cordierite carrier having a size of 3 mil per 600 cells, a diameter of 86 mm and a length of 104 mm so as to homogeneously apply, to a surface of the inner layer, 3.2 g of the theta-alumina supporting the platinum containing perovskite-type composite oxide, 40 g of the Pt—Rh supporting zirconia composite oxide, and 60 g of the Pt supporting ceria composite oxide per one liter of the honeycomb carrier. The resulting article dried at 100° C. and baked at 500° C. to form an outer layer. Thus, an exhaust gas purifying catalyst was produced.

The exhaust gas purifying catalyst contained 0.10 g of Pt and 0.35 g of Pd in the inner layer, and 0.60 g of Pt and 0.50 g of Rh in the outer layer, respectively, per one liter of the honeycomb carrier.

Comparative Example QX-1

| Lanthanum ethoxyethylate | 40.6 g (0.100 mol) |
|---|---|
| Iron ethoxyethylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

Next, the powdery zirconia composite oxide (Production Example A5) comprising a $Zr_{0.70}Ce_{0.25}La_{0.02}Y_{0.03}$ oxide was dissolved in 200 mL of toluene, and the resulting solution was added to the homogeneous mixed solution in the round bottomed flask with stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a zirconia composite oxide with a dispersed pre-crystallization composition of a LaFePd composite oxide. Next, the zirconia composite oxide with the dispersed pre-crystallization composition (mixture) was placed on a petri dish, subjected to forced air drying at 60° C. for twenty four hours and heat treated in an electric furnace at 650° C. in the air for one hour to obtain a powdery exhaust gas purifying catalyst comprising a $Zr_{0.70}Ce_{0.25}La_{0.02}Y_{0.03}$ oxide zirconia composite oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 1:4.

Comparative Example QX-2

| Lanthanum ethoxyethylate | 40.6 g (0.100 mol) |
|---|---|
| Iron ethoxyethylate | 30.7 g (0.095 mol) |

The above listed components were charged in a 1000 mL round bottomed flask, dissolved in 200 mL of toluene with stirring to obtain a mixed alkoxide solution. Separately, 2.00 g (0.005 mol) of rhodium acetylacetonate was dissolved in 100 mL of toluene, the resulting solution was added to the mixed alkoxide solution in the round bottomed flask to obtain a LaFeRh containing homogeneous mixed solution.

Separately, the powdery zirconia composite oxide (Production Example A3) comprising a $Zr_{0.50}Ce_{0.40}La_{0.05}Y_{0.05}$ oxide was dissolved in 100 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a mixture of a zirconia composite oxide with a dispersed pre-crystallization composition of a LaFeRh composite oxide. Next, the zirconia composite oxide with the dispersed pre-crystallization composition (mixture) was placed on a petri dish, subjected to forced air drying at 60° C. for twenty four hours and heat treated in an electric furnace at 650° C. in the air for one hour to obtain a powdery exhaust gas purifying catalyst comprising a $Zr_{0.50}Ce_{0.40}La_{0.05}Y_{0.05}$ oxide zirconia composite oxide supporting a $La_{1.00}Fe_{0.95}Rh_{0.05}O_3$ perovskite-type composite oxide.

The resulting powder was prepared so as to have a weight ratio of the perovskite-type composite oxide to the zirconia composite oxide of 2:3.

Comparative Example QX-3

| Lanthanum methoxypropylate | 36.6 g (0.090 mol) |
| Calcium methoxypropylate | 2.2 g (0.010 mol) |
| Iron methoxypropylate | 29.1 g (0.090 mol) |

The above listed components were charged in a 1000 mL round bottomed flask, dissolved in 200 mL of toluene with stirring to obtain a mixed alkoxide solution. Separately, 3.93 g (0.010 mol) of platinum acetylacetonate was dissolved in 100 mL of toluene, the resulting solution was added to the mixed alkoxide solution in the round bottomed flask to obtain a LaCaFePt containing homogeneous mixed solution.

Separately, the powdery zirconia composite oxide (Production Example A6) comprising a $Zr_{0.70}Ce_{0.25}Pr_{0.02}Nd_{0.03}$ oxide was dispersed in 100 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure, thereby to obtain a mixture of a zirconia composite oxide with a dispersed pre-crystallization composition of a LaCaFePt containing perovskite-type composite oxide. Next, the zirconia composite oxide with the dispersed pre-crystallization composition (mixture) was placed on a petri dish, subjected to forced air drying at 60° C. for twenty four hours and heat treated in an electric furnace at 800° C. in the air for one hour to obtain a powdery exhaust gas purifying catalyst comprising a $Zr_{0.70}Ce_{0.25}Pr_{0.02}Nd_{0.03}$ oxide zirconia composite oxide supporting a $La_{0.90}Ca_{0.10}Fe_{0.90}Pt_{0.10}O_3$ perovskite-type composite oxide.

The resulting powder was prepared so as to have a weight ratio of the perovskite-type composite oxide to the zirconia composite oxide of 1:4.

Comparative Example QX-4

| Lanthanum ethoxyethylate | 40.6 g (0.100 mol) |
| Iron ethoxyethylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

The homogeneous mixed solution was hydrolyzed by adding 200 mL of deionized water dropwise thereto over about fifteen minutes. The resulting brown slurry was mixed with a dispersion of 98.0 g of a powdery gamma-alumina in 200 mL of deionized water. After stirring at room temperature for two hours, the toluene and water were distilled off under reduced pressure, thereby to obtain a mixture of a gamma-alumina with a dispersed pre-crystallization composition of a LaFePd containing perovskite-type composite oxide.

Next, the gamma-alumina with the dispersed pre-crystallization composition (mixture) was placed on a petri dish, subjected to forced air drying at 60° C. for twenty four hours and heat treated in an electric furnace at 650° C. in the air for one hour to obtain a powdery exhaust gas purifying catalyst comprising a gamma-alumina supporting a $La_{1.00}Fe_{0.95}Pd_{0.05}O_3$ perovskite-type composite oxide.

The resulting powder was prepared so as to have a weight ratio of the perovskite-type composite oxide to the gamma-alumina of 1:4.

Comparative Example RX-5

The powdery Pd supporting theta-alumina (Production Example C7) comprising a theta-alumina supporting 1.10% by weight of Pd was mixed with the powdery Pt supporting ceria composite oxide (Production Example B1-5) comprising a $Ce_{0.60}Zr_{0.30}Y_{0.10}$ oxide supporting 1.50% by weight of Pt, and the powdery Pt—Rh supporting theta-alumina (Production Example C6-3) comprising a theta-alumina supporting 1.50% by weight of Pt and 0.67% by weight of Rh. The resulting mixture was mixed with deionized water and was then mixed with alumina sol to form a slurry. The slurry was injected into a honeycomb cordierite carrier having a size of 3 mil per 600 cells, a diameter of 86 mm and a length of 104 mm so as to homogeneously apply 30 g of the Pd supporting theta-alumina, 40 g of the Pt supporting ceria composite oxide, and 60 g of the Pt—Rh supporting theta-alumina per one liter of the honeycomb carrier. The resulting article dried at 100° C. and baked at 500° C. to obtain an exhaust gas purifying catalyst. The exhaust gas purifying catalyst contained 1.50 g of Pt, 0.33 g of Pd, and 0.40 g of Rh, per one liter of the honeycomb carrier.

Comparative Example RX-6

1) Formation of Inner Layer

1)-1 Supporting of Palladium Containing Perovskite-Type Composite Oxide by Thermostable Oxide

| Lanthanum ethoxyethylate | 40.6 g (0.100 mol) |
| Iron ethoxyethylate | 30.7 g (0.095 mol) |

The above listed components were charged in a 1000 mL round bottomed flask, dissolved in 200 mL of toluene with stirring to obtain a mixed alkoxide solution. Separately, 1.52 g (0.005 mol) of palladium acetylacetonate was dissolved in 100 mL of toluene, the resulting solution was added to the mixed alkoxide solution in the round bottomed flask to obtain a LaFePd containing homogeneous mixed solution.

The homogeneous mixed solution was hydrolyzed by adding 200 mL of deionized water dropwise thereto over about fifteen minutes. The resulting brown slurry was mixed with a dispersion of a powdery gamma-alumina in 200 mL of deionized water. After stirring at room temperature for two hours, the toluene and water were distilled off under reduced pressure, thereby to obtain a mixture of a gamma-alumina with a dispersed pre-crystallization composition of a LaFePd containing perovskite-type composite oxide.

Next, the gamma-alumina with the dispersed pre-crystallization composition (mixture) was placed on a petri dish, subjected to forced air drying at 60° C. for twenty four hours and heat treated in an electric furnace at 650° C. in the air for one hour to obtain a powdery gamma-alumina supporting a $La_{1.00}Fe_{0.95}Pd_{0.05}O_3$ perovskite-type composite oxide.

The resulting powder was prepared so as to have a weight ratio of the perovskite-type composite oxide to the gamma-alumina of 1:1.

1) -2 Production of Inner Layer

To the above prepared powdery gamma-alumina supporting the palladium containing perovskite-type composite oxide was added a powdery gamma-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 60 g of the gamma-alumina supporting the palladium containing perovskite-type composite oxide and 30 g of the gamma-alumina per one liter of the honeycomb carrier. The resulting article dried at 100° C. and baked at 500° C. to form an inner layer.

2) Production of Outer Layer and Exhaust Gas Purifying Catalyst

To the powdery Pt—Rh supporting ceria composite oxide (Production Example B2-1) comprising a $Ce_{0.30}Zr_{0.70}O_2$ supporting 2.00% by weight of Pt and 1.00% by weight of Rh was added a powdery gamma-alumina. The resulting mixture was further mixed with deionized water and then mixed with alumina sol to form a slurry. The slurry was charged into a honeycomb cordierite carrier having a size of 3 mil per 600 cells, a diameter of 86 mm and a length of 104 mm so as to homogeneously apply, to a surface of the inner layer, 50 g of the Pt—Rh supporting ceria composite oxide and 30 g of the gamma-alumina per one liter of the honeycomb carrier. The resulting article dried at 100° C. and baked at 500° C. to form an outer layer. Thus, an exhaust gas purifying catalyst was produced.

The exhaust gas purifying catalyst contained 1.00 g of Pt, 0.66 g of Pd, and 0.50 g of Rh per one liter of the honeycomb carrier.

Determination

Test Example 1

1) High Temperature Endurance Treatment (R/L 1000° C.)

The above prepared powdery exhaust gas purifying catalysts according to Examples and Comparative Examples shown in Table 1 were subjected to high temperature endurance treatment under the following relations. In the high temperature endurance treatment, the atmospheric temperature was set at 1000° C., and a cycle for a total of 30 minutes comprising an inert atmosphere for 5 minutes, an oxidative atmosphere for 10 minutes, an inert atmosphere for 5 minutes, and a reducing atmosphere for 10 minutes was repeated 10 times, for a total of five hours. The above atmospheres were constituted by supplying gases containing high temperature steam and having the following compositions, respectively, at a flow rate of 300 L/hr. The temperatures of the atmospheres were hold to 1000° C. by the action of high temperature steam.

Inert atmosphere gas composition: 8% of $CO_2$, 10% of $H_2O$, with the balance of $N_2$ Oxidative atmosphere gas composition: 1% of $O_2$, 8% of $CO_2$, 10% of $H_2O$, with the balance of $N_2$ Reducing atmosphere gas composition: 0.5% of $H_2$, 1.5% of CO, 8% of $CO_2$, 10% of $H_2O$, with the balance of $N_2$ 2) High Temperature Endurance Treatment (Air 1150° C.)

The above prepared powdery exhaust gas purifying catalysts according to Examples and Comparative Examples shown in Table 1 were subjected to the high temperature endurance treatment in an atmosphere of the air (in a normal atmosphere).

3) Measurement of Specific Surface Area

The specific surface areas of the above prepared powdery exhaust gas purifying catalysts according to Examples and Comparative Examples shown in Table 1 were measured before and after the high temperature endurance treatments. The specific surface areas were measured according to the BET method. The results are shown in Table 1.

TABLE 1

| | | Test Example 1 Specific surface area (m2/g) | | | | |
|---|---|---|---|---|---|---|
| Examples/ Comparative Examples | Composition | Before high temperature endurance treatment | After endurance treatment (1000° C.) | After endurance test/Before endurance treatment (1000° C.) (%) | After endurance treatment (1150° C.) | After endurance test/Before endurance treatment (1150° C.) (%) |
| Example QA-1 | La1.00Fe0.95Pd0.05O3/ theta-alumina (1:3) | 75.2 | 66.2 | 88.0 | 40.2 | 53.5 |
| Example QA-2 | La1.00Fe0.95Pd0.05O3/ La-theta-alumina (La:4%) (1:4) | 87.5 | 82.5 | 94.3 | 62.2 | 71.1 |
| Example QA-3 | La1.00Fe0.95Pd0.05O3/ La-theta-alumina (La:4%) (1:1) | 51.2 | 46.1 | 90.0 | 35.3 | 68.9 |
| Example QA-4 | La1.00Fe0.57Mn0.38Rh0.05O3/ La-theta-alumina (La:2%) (1:9) | 96.4 | 91.3 | 94.7 | 71.9 | 74.6 |
| Example QA-5 | La1.00Fe0.95Rh0.05O3/ La-theta-alumina (La:10%) (2:3) | 63.2 | 57.3 | 90.7 | 43.8 | 69.3 |

TABLE 1-continued

| Examples/ Comparative Examples | Composition | Test Example 1 Specific surface area (m2/g) | | | | |
|---|---|---|---|---|---|---|
| | | Before high temperature endurance treatment | After endurance treatment (1000° C.) | After endurance test/Before endurance treatment (1000° C.) (%) | After endurance treatment (1150° C.) | After endurance test/Before endurance treatment (1150° C.) (%) |
| Example QA-6 | La0.95Ag0.05Fe0.57Mn0.38Pt0.05O3/ La-theta-alumina (La:10%) (1:1) | 51.1 | 47.2 | 92.4 | 35.5 | 69.5 |
| Example QA-7 | La0.90Ca0.10Fe0.90Pt0.10O3/ theta-alumina (1:4) | 85.4 | 77.0 | 90.2 | 58.3 | 68.3 |
| Example QA-7-1 | La1.00Fe0.90Pd0.10O3/ La-theta-alumina (La:4%) (1:1) | 48.7 | 40.3 | 82.8 | 33.6 | 69.0 |
| Example QA-7-2 | La1.00Fe0.80Pd0.20O3/ La-theta-alumina (La:4%) (1:1) | 50.4 | 42.8 | 84.9 | 35.3 | 70.0 |
| Comparative Example QX-1 | La1.00Fe0.95Pd0.05O3/ Zr0.70Ce0.25La0.02Y0.03Oxide (1:4) | 50.1 | 42.3 | 84.4 | 5.3 | 10.6 |
| Comparative Example QX-2 | La1.00Fe0.95Rh0.05O3/ Zr0.50Ce0.40La0.05Y0.05Oxide (2:3) | 25.2 | 16.0 | 63.5 | 3.4 | 13.5 |
| Comparative Example QX-3 | La0.90Ca0.10Fe0.90Pt0.10O3/ Zr0.70Ce0.25Pr0.02Nd0.03Oxide (1:4) | 43.2 | 35.3 | 81.7 | 3.1 | 7.2 |
| Comparative Example QX-4 | La1.00Fe0.95Pd0.05O3/ gamma-alumina (1:4) | 140.6 | 101.4 | 72.1 | 43.2 | 30.7 |

Test Example 2

1) Endurance Test

The exhaust gas purifying catalysts according to Examples and Comparative Examples were connected to a bank of a V type eight cylinder engine of 4 liters. With the cycle shown in Tables 2 and 3 as a single cycle (30 seconds) at 1050° C. or 1100° C., the endurance test was repeated for time periods shown in Tables 2 and 3. Then, annealing was carried out at a fuel-air ratio A/F of 14.3, at 900° C. for two hours.

One cycle was set as follows. Specifically, from Second 0 to Second 5 (a period of 5 seconds), a mixed gas which was kept of amount of theoretical fuel-air ratio (A/F=14.6, in the stoichiometric state) under feedback control was fed to the engine and the internal temperature of the exhaust gas purifying catalysts was set at around 850° C. From Second 5 to Second 30 (a period of 25 seconds), the feedback was released. From Second 5 to Second 7 (a period of 2 seconds), the fuel was injected excessively, so that the fuel rich mixed gas (A/F=11.2) was fed to the engine. From Second 7 to Second 28 (a period of 21 seconds), while an excessive amount of fuel was kept on being fed to the engine, secondary air was introduced from the upstream into the exhaust gas purifying catalysts through an inlet tube, to cause the excessive fuel to react with the secondary air in the interior of the exhaust gas purifying catalysts, so as to raise the temperature. In this time period, the fuel-air ratio in the exhaust gas in the exhaust gas purifying catalysts was substantially kept in a somewhat lean state than the stoichiometric state (A/F=14.8), and the highest temperature in the catalyst bed was 1050° C. or 1100° C. as shown in Tables 2 and 3. From Second 28 to Second 30 (a period of 2 seconds), no excessive fuel was fed to the engine but the secondary air was fed to the exhaust gas purifying catalysts to put the exhaust gas into a lean state.

The temperatures of the exhaust gas purifying catalysts were measured with a thermocouple inserted into a center part of the honeycomb carrier. A phosphorus compound was added to the fuel (gasoline) so that phosphorus element in the exhaust gas poisons the catalysts. The amount of the phosphorus compound was set so that 816 mg in terms of phosphorus element was deposited to the exhaust gas purifying catalysts during the endurance time shown in Tables 4 to 7.

2) HC 50% Purification Temperature

The mixed gas held substantially in the stoichiometric state was supplied to the engine. While the temperature of the exhaust gas exhausted by the combustion of the mixed gas was raised at a rate of 30° C. per minute, the exhaust gas was fed to the exhaust gas purifying catalysts according to Examples and Comparative Examples shown in Tables 2 and 3 which had been subjected to the endurance.

The exhaust gas was fed to the exhaust gas purifying catalysts at a space velocity SV of 90000/h. The HC level in the exhaust gas treated by the exhaust gas purifying catalysts was measured. In this procedure, the HC 50% purification temperature was defined as the temperature at the time when HC in the exhaust gas was purified to 50%. The results are shown in Tables 2 and 3. The mixed gas to be fed to the engine was set substantially in the stoichiometric state by the feed back control, and the A/F was set at 14.6±1.0.

TABLE 2

| Examples | Composition | Amount supported (g/L) | | | Test Example 2 | | |
|---|---|---|---|---|---|---|---|
| | | | | | Endurance test Cycling time | HC 50% purification temperature for endurance (° C.) | |
| | | Pt | Pd | Rh | (hrs) | 1050° C. | 1100° C. |
| Example RA-8 | La1.00Fe0.95Pd0.05O3/ La-theta-alumina (La:4%) (1:1) (30 g) + Pt-Rh/Zr0.76Ce0.18La0.02Nd0.04Oxide (30 g) + Pt/Ce0.60Zr0.30Y0.10Oxide (80 g) + Pt-Rh/theta-alumina (70 g) | 1.50 | 0.33 | 0.40 | 40 48 | — 351 | 392 — |
| Example RA-9 | La1.00Fe0.95Pd0.05O3/ La-theta-alumina (La:4%) (1:1) (30 g) + Pt/Ce0.60Zr0.30Y0.10Oxide (80 g) + Pt-Rh/gamma-alumina (70 g) | 1.50 | 0.33 | 0.40 | 40 48 | — 362 | 423 — |
| Example RA-9-1 | La1.00Fe0.95Pd0.05O3/ alpha-alumina (1:2) (45 g) + Pt-Rh/Zr0.76Ce0.18La0.02Nd0.04Oxide (40 g) + Pt/Ce0.60Zr0.30Y0.10Oxide (80 g) + gamma-alumina (70 g) | 1.50 | 0.33 | 0.40 | 40 48 | — 365 | 418 — |
| Comparative Example RX-5 | Pd/theta-alumina (30 g) + Pt/Ce0.60Zr0.30Y0.10Oxide (40 g) + Pt-Rh/theta-alumina (60 g) | 1.50 | 0.33 | 0.40 | 40 48 | — 395 | >500 — |

TABLE 3

| Examples | Composition | | Amount supported (g/L) | | | Test Example 2 | | |
|---|---|---|---|---|---|---|---|---|
| | Inner layer | Outer layer | | | | Endurance test Cycling time (hrs) | HC 50% purification temperature for endurance (° C.) | |
| | | | Pt | Pd | Rh | | 1050° C. | 1100° C. |
| Example RC-10 | La1.00Fe0.95Pd0.05O3/ La-theta-alumina (La:4%) (1:1) (28 g) + Pt/Ce0.60Zr0.30Y0.10Oxide (60 g) + theta-alumina (70 g) | Pt-Rh/ Zr0.76Ce0.18La0.02Nd0.04 Oxide (30 g) + Pt/Ce0.60Zr0.30Y0.10Oxide (60 g) + Pt/theta-alumina (70 g) | 0.60 | 0.30 | 0.40 | 40 48 | — 359 | 377 — |
| Example RC-11 | La1.00Fe0.95Pd0.05O3/ La-theta-alumina (La:4%) (1:1) (30 g) + Pt/Ce0.60Zr0.30Y0.10Oxide (30 g) + theta-alumina (80 g) | Pt-Rh/ Zr0.50Ce0.40La0.05Nd0.05 Oxide (30 g) + Pt/Ce0.60Zr0.30Y0.10Oxide (60 g) + Pt-Rh/theta-alumina (70 g) | 0.78 | 0.33 | 0.55 | 40 48 | — 347 | 368 — |
| Example RC-12 | La1.00Fe0.95Pd0.05O3/ Ba-theta-alumina (Ba:4%) (1:4) (46 g) + Pt/Ce0.60Zr0.30Y0.10Oxide (45 g) | La1.00Fe0.95Rh0.05O3/ theta-alumina (1:3) (38 g) + Pt/Ce0.60Zr0.30Y0.10Oxide (60 g) | 0.70 | 0.20 | 0.20 | 40 48 | — 361 | 374 — |
| Example RC-13 | La1.00Fe0.95Pd0.05O3/ alpha-alumina (2:3) (40 g) + Pt/Ce0.60Zr0.30Y0.10Oxide (30 g) + theta-alumina (80 g) | La0.90Ca0.10Fe0.90Pt0.10O3/ theta-alumina (2:3) (3.2 g) + Pt-Rh/ Zr0.70Ce0.25La0.02Nd0.03 Oxide (40 g) + Pt/Ce0.60Zr0.30Y0.10Oxide (60 g) | 0.70 | 0.35 | 0.50 | 40 48 | — 335 | 363 — |
| Comparative Example RX-6 | La1.00Fe0.95Pd0.05O3/gamma-alumina (1:1) (60 g) + gamma-alumina (30 g) | Pt-Rh/Ce0.30Zr0.70O2 (50 g) + gamma-alumina (30 g) | 1.00 | 0.66 | 0.50 | 48 | — 432 | >500 — |

While the illustrative embodiments and examples of the present invention are provided in the above description, such is for illustrative purpose only and it is not to be construed restrictively. Modification and variation of the present invention which will be obvious to those skilled in the art is to be covered in the following claims.

INDUSTRIAL APPLICABILITY

The present invention is utilized as a method for industrially efficiently producing an exhaust gas purifying catalyst.

The invention claimed is:

1. A method for producing an exhaust gas purifying catalyst, which comprises the steps of:
    preparing a pre-crystallization composition containing elementary components, the elementary components constituting a perovskite-type composite oxide containing a noble metal;
    mixing the pre-crystallization composition with a powder of theta-alumina and/or alpha-alumina to prepare a mixture; and
    subjecting the pre-crystallization mixture to heat treatment whereby, the perovskite-type composite oxide containing the noble metal is supported on theta-alumina and/or alpha-alumina;
    wherein the perovskite-type composite oxide is represented by the general formula (1):

$$AB_{1-m}N_mO_3 \quad (1)$$

wherein A represents at least one element selected from rare earth elements and alkaline earth metals; B represents at least one element selected from Al and transition elements excluding the rare earth elements and noble metals; N represents at least one noble metal; and m represents an atomic ratio of N satisfying the following relation: $0<m<0.5$; and
    wherein said method results in the perovskite-type composite oxide containing a noble metal supported on theta-alumina and/or alpha-alumina, and does not include adding further noble metal to said theta-alumina and/or alpha-alumina.

2. The method for producing an exhaust gas purifying catalyst according to claim 1, wherein N in the general formula (1) is at least one selected from the group consisting of Rh, Pd, and Pt.

3. The method for producing an exhaust gas purifying catalyst according to claim 1, wherein the perovskite-type composite oxide represented by the general formula (1) is at least one selected from the group consisting of Rh containing perovskite-type composite oxides represented by the following general formula (2), Pd containing perovskite-type composite oxides represented by the following general formula (3), and Pt containing perovskite-type composite oxides represented by the general formula (4):

$$A_{1-p}A'_pB_{1-q}Rh_qO_3 \quad (2)$$

wherein A represents at least one element selected from La, Nd, and Y; A' represents Ce and/or Pr; B represents at least one element selected from Fe, Mn, and Al; p represents an atomic ratio of A' satisfying the following relation $0 \leq p<0.5$; and q represents an atomic ratio of Rh satisfying the following relation: $0<q \leq 0.8$, $$AB_{1-r}Pd_rO_3 \quad (3)$$

wherein A represents at least one element selected from La, Nd, and Y; B represents at least one element selected from Fe, Mn and Al; and r represents an atomic ratio of Pd satisfying the following relation: $0<r<0.5$, $$A_{1-s}A'_sB_{1-t-u}B'_tPt_uO_3 \quad (4)$$

wherein A represents at least one element selected from La, Nd, and Y; A' represents at least one element selected from Mg, Ca, Sr, Ba, and Ag; B represents at least one element selected from Fe, Mn, and Al; B' represents at least one element selected from Rh and Ru; s represents an atomic ratio of A' satisfying the following relation: $0<s \leq 0.5$; t represents an atomic ratio of B' satisfying the following relation: $0 \leq t<0.5$; and u represents an atomic ratio of Pt satisfying the following relation: $0<u \leq 0.5$.

4. The method for producing an exhaust gas purifying catalyst according to claim 1, theta-alumina and/or alpha-alumina is represented by the following general formula (5):

$$(Al_{1-g}D_g)_2O_3 \quad (5)$$

wherein D represents La and/or Ba; and g represents an atomic ratio of D satisfying the following relation: $0 \leq g \leq 0.5$.

5. The method for producing an exhaust gas purifying catalyst according to claim 1, further comprising preparing the pre-crystallization composition by mixing a solution containing alkoxides of elementary components constituting the perovskite-type composite oxide excluding at least one noble metal with a solution containing an organometal salt of at least one noble metal.

6. The method for producing an exhaust gas purifying catalyst according to claim 5, wherein the organomatal salt of the noble metal is a noble metal complex comprising at least one of a β-diketone compound or β-ketoester compound represented by the following general formula (6) and/or a β-dicarboxylic ester compound represented by the following general formula (7):

$$R^3COCHR^5COR^4 \quad (6)$$

wherein $R^3$ represents an alkyl group having 1 to 6 carbon atoms, a fluoroalkyl group having 1 to 6 carbon atoms or an aryl group; $R^4$ represents an alkyl group having 1 to 6 carbon atoms, a fluoroalkyl group having 1 to 6 carbon atoms, an aryl group or an alkyloxy group having 1 to 4 carbon atoms; and $R^5$ represents a hydrogen atom or an alkyl group having 1 to 4 carbon atoms, $$R^7CH(COOR^6)_2 \quad (7)$$

wherein $R_6$ represents an alkyl group having 1 to 6 carbon atoms; and $R^7$ represents a hydrogen atom or an alkyl group having 1 to 4 carbon atoms.

7. The method of claim 1, wherein the pre-crystallization composition comprises elementary components of at least one noble metal.

8. The method of claim 1, further comprising mixing elementary components of at least one noble metal with the pre-crystallization composition containing elementary components of other elementary components constituting a perovskite-type composite oxide.

9. The method of claim 1, further comprising mixing elementary components of at least one noble metal into the mixture of pre-crystallization composition and theta-alumina and/or alpha-alumina.

* * * * *